(12) United States Patent
Hayakawa et al.

(10) Patent No.: US 11,731,632 B2
(45) Date of Patent: Aug. 22, 2023

(54) VEHICLE TRAVEL CONTROL METHOD AND TRAVEL CONTROL DEVICE

(71) Applicant: Nissan Motor Co., Ltd., Yokohama (JP)

(72) Inventors: Yasuhisa Hayakawa, Kanagawa (JP); Takahiko Oki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 426 days.

(21) Appl. No.: 17/267,341

(22) PCT Filed: Aug. 13, 2018

(86) PCT No.: PCT/JP2018/030214
§ 371 (c)(1),
(2) Date: Feb. 9, 2021

(87) PCT Pub. No.: WO2020/035896
PCT Pub. Date: Feb. 20, 2020

(65) Prior Publication Data
US 2021/0237739 A1    Aug. 5, 2021

(51) Int. Cl.
*B60W 30/18*     (2012.01)
*B60W 50/00*     (2006.01)
(Continued)

(52) U.S. Cl.
CPC ...... *B60W 30/18163* (2013.01); *B60W 50/10* (2013.01); *B60W 50/14* (2013.01);
(Continued)

(58) Field of Classification Search
CPC ........... B60W 30/18163; B60W 50/10; B60W 50/14; B60W 60/0016; B60W 2050/0063;
(Continued)

(56) References Cited

U.S. PATENT DOCUMENTS

2017/0225702 A1* 8/2017 Yamada ................ B60W 50/10
2017/0341653 A1* 11/2017 Kubota ............. G01C 21/3658
(Continued)

FOREIGN PATENT DOCUMENTS

WO    2017/094316 A1    6/2017

*Primary Examiner* — Abby Y Lin
*Assistant Examiner* — Hossam M Abd El Latif
(74) *Attorney, Agent, or Firm* — Young Basile Hanlon & MacFarlane, P.C.

(57) ABSTRACT

A travel control method for executing autonomous lane change control of a vehicle includes, before performing two or more successive lane changes, presenting the driver with first lane change information as to whether or not to accept execution of autonomous control of the successive lane changes; when detecting a first acceptance input made by the driver indicating that the driver accepts the execution of the autonomous control, executing first autonomous lane change control; then presenting the driver with second lane change information as to whether or not to accept execution of the autonomous lane change control after the first lane change; and when detecting a second acceptance input made by the driver, executing the autonomous lane change control after the first lane change. An action load of the second acceptance input is set smaller than an action load of the first acceptance input.

10 Claims, 25 Drawing Sheets

Before start of successive lane changes
(First lane change information)

After first lane change and before start of second lane change (Second lane change information)

(51) Int. Cl.
*B60W 50/10* (2012.01)
*B60W 50/14* (2020.01)
*B60W 60/00* (2020.01)
*G08G 1/16* (2006.01)

(52) U.S. Cl.
CPC . *B60W 60/0016* (2020.02); *B60W 2050/0063* (2013.01); *B60W 2050/146* (2013.01)

(58) Field of Classification Search
CPC ..... B60W 2050/146; B60W 2540/215; B60W 60/001; G08G 1/167
USPC .......................................................... 701/41
See application file for complete search history.

(56) References Cited

U.S. PATENT DOCUMENTS

| | | | |
|---|---|---|---|
| 2018/0029612 A1* | 2/2018 | Tsuyunashi | B60W 40/04 |
| 2018/0118223 A1* | 5/2018 | Mori | B60W 40/04 |
| 2018/0225975 A1* | 8/2018 | Park | G05D 1/0293 |
| 2018/0354517 A1 | 12/2018 | Banno et al. | |

\* cited by examiner

FIG. 2

| Travel scene | Determination condition | Direction of changing lanes | Necessity level of changing lanes | Time limit |
|---|---|---|---|---|
| Scene of catching up with preceding vehicle | "Preceding vehicle exists ahead" and "Vehicle speed of preceding vehicle < Set vehicle speed of subject vehicle" and "Subject vehicle will reach preceding vehicle within predetermined time" and "Direction of changing lanes is not under lane change prohibition condition" | Toward overtaking lane side | X 1 | Time to reach preceding vehicle − α |
| Scene of approaching tollgate | "Time to reach tollgate located ahead is less than 60 seconds" and "Direction of changing lanes is not under lane change prohibition condition" | Toward empty toll gate booth side | X 2 | Time to reach tollgate − α |
| Scene of approaching merging point | "Time to reach merging point located ahead is less than predetermined time" and "Direction of changing lanes is not under lane change prohibition condition" | Toward opposite side to merging lane | X 3 | Time to reach merging point − α |
| Obstruction scene of subject vehicle lane | "Travel lane of subject vehicle will disappear within predetermined distance" and "Direction of changing lanes is not under lane change prohibition condition" | Toward unobstructed lane side | X 4 | Time to reach obstructed point − α |
| Scene of avoiding object on road | "Pedestrian, bicycle, motorcycle, or fallen object on road exists ahead" and "Direction of changing lanes is not under lane change prohibition condition" | Toward unoccupied lane side | X 5 | Time to reach object on road − α |
| Scene of being caught up by vehicle from behind | "Following vehicle exists in travel lane of subject vehicle" and "Vehicle speed of following vehicle > Vehicle speed of subject vehicle" and "Following vehicle will reach subject vehicle within predetermined time" and "Direction of changing lanes is not under lane change prohibition condition" | Toward opposite side to overtaking lane | X 6 | Time for following vehicle to reach subject vehicle − α |
| Emergency evacuation scene | "Onboard equipment is not operated within predetermined time" and "Driver is determined to be incapable of driving" and "Direction of changing lanes is not under lane change prohibition condition" | Toward road shoulder side | X 7 | None |
| Scene of lane transfer toward destination | "Destination is set" and "Time to reach lane change point is within predetermined time" and "Direction of changing lanes is not under lane change prohibition condition" | Toward lane side for heading to destination | X 8 (X 1 < X 8) | Time to reach lane change point − α |
| Scene of heading to SA/PA | "Time to reach SA/PA is within predetermined time" "Elapsed time after previous rest is predetermined time or more" and "Direction of changing lanes is not under lane change prohibition condition" | Toward lane side near SA/PA | X 9 | Time to reach SA/PA − α |

FIG. 4A

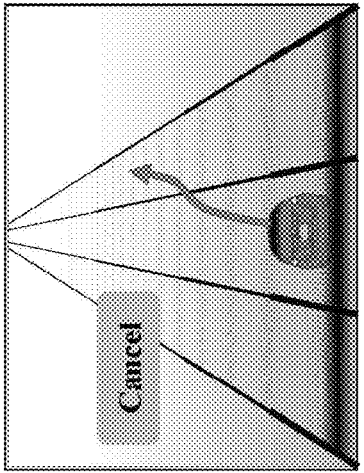

Do you accept successive lane changes?
If you accept the lane changes, please touch acceptance button.

Before start of successive lane changes
(First lane change information)

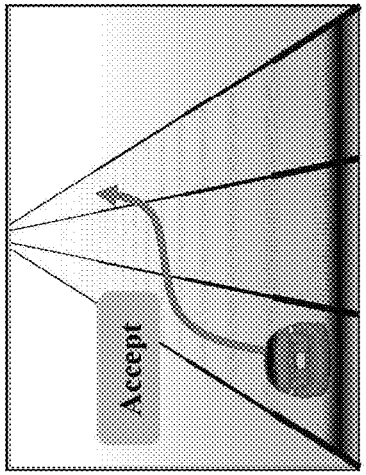

Do you discontinue lane changes?
If you discontinue the lane changes, please touch cancel button.

After first lane change and before start of second lane change (Second lane change information)

FIG. 4B

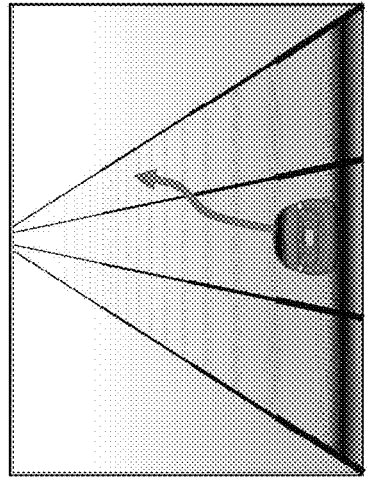

Do you continue successive lane changes?
If you continue the lane changes, please operate blinker lever once.

After first lane change and before start of second lane change (Second lane change information)

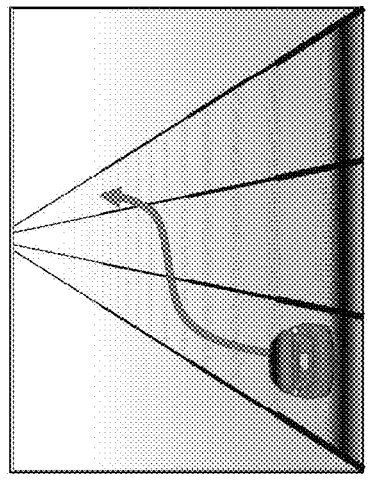

Do you accept successive lane changes?
If you accept the lane changes, please operate blinker lever twice.

Before start of successive lane changes (First lane change information)

FIG. 4C

Do you continue successive lane changes?
If you continue the lane changes, please touch acceptance button.

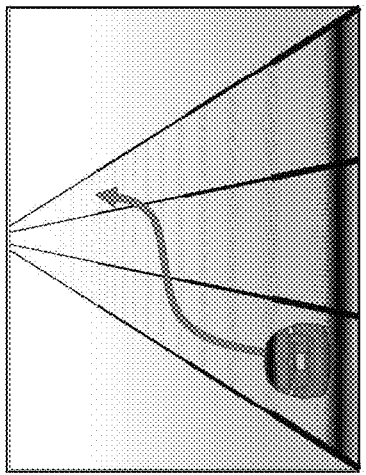

After first lane change and before start of second lane change (Second lane change information)

Do you accept successive lane changes?
If you accept the lane changes, please operate blinker lever in the direction of lane changes.

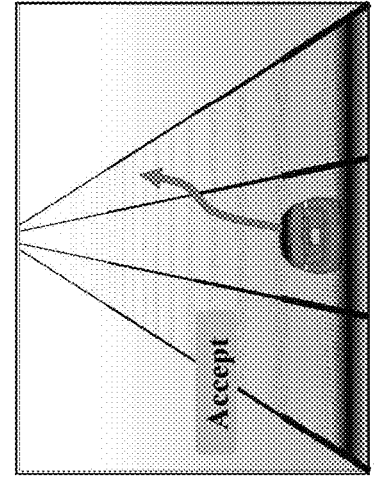

Before start of successive lane changes (First lane change information)

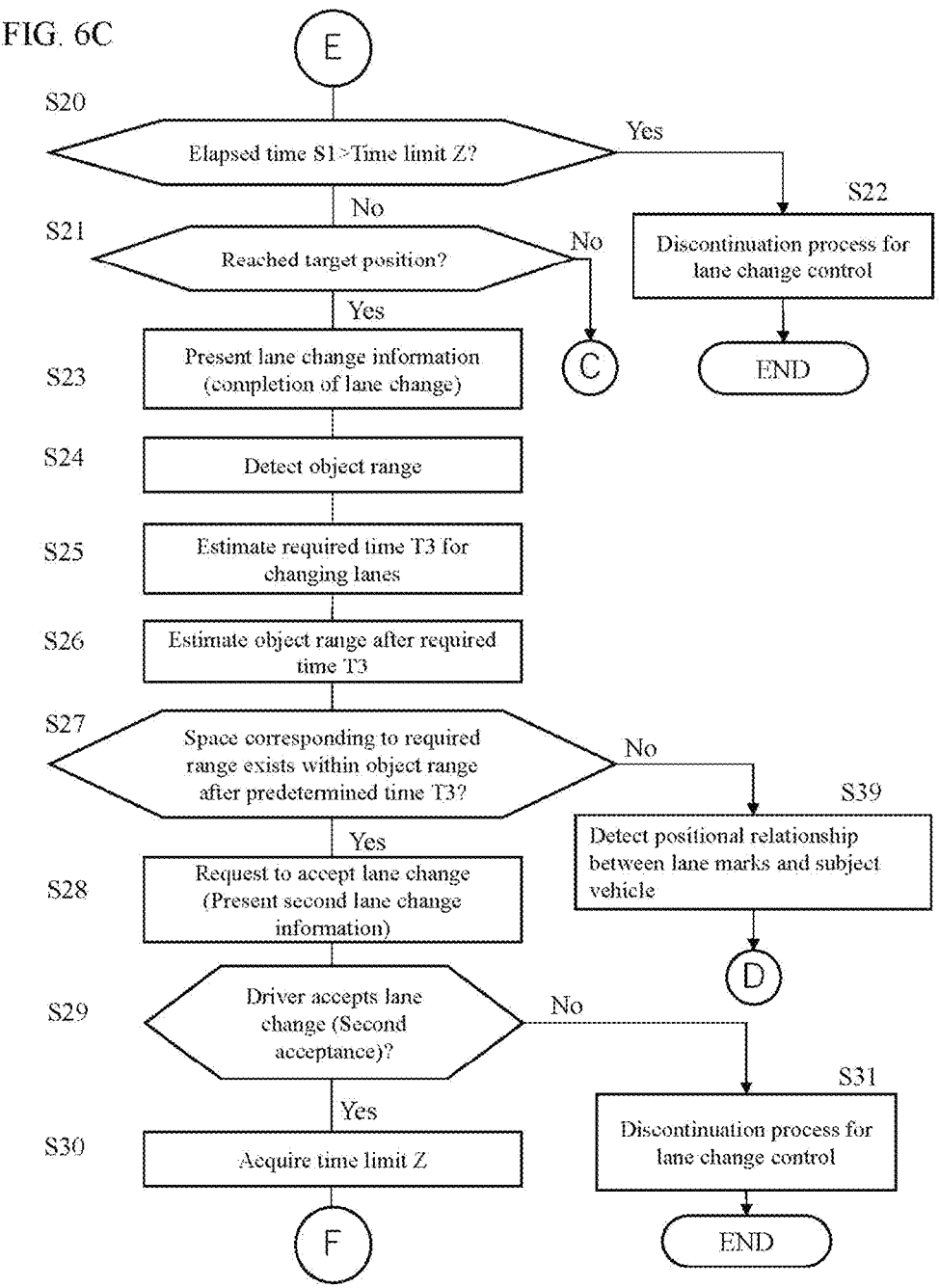

VEHICLE TRAVEL CONTROL METHOD AND TRAVEL CONTROL DEVICE

TECHNICAL FIELD

The present invention relates to a travel control method and a travel control apparatus for a vehicle that include controlling the change of travel lanes.

BACKGROUND

A driving assist device is known with the purpose of encouraging the driver to confirm safety by himself/herself when controlling the vehicle to autonomously change lanes (WO2017/094316). When a determination is made that lane change is possible, this device detects the driver's intention of lane change on the basis of an input of the driver's blinker lever operation or steering switch operation and autonomously performs the lane change with the driver's intention as a condition.

SUMMARY

In the above prior art, however, when successively changing lanes, the driver is required to operate the blinker lever or the steering switch to indicate the intention to change lanes each time the lane change is performed.

A problem to be solved by the present invention is to provide a travel control method and a travel control apparatus for a vehicle that are able to reduce the load of an action performed by the driver to indicate his/her intention when successively changing lanes.

In the travel control of executing autonomous (automated) lane change control of a vehicle, the present invention solves the above problem as follows. When performing the autonomous control of two or more successive lane changes, the action load of a second acceptance input made by the driver in response to second lane change information as to whether or not to accept the autonomous lane change control after first autonomous lane change control is set smaller than the action load of a first acceptance input made by the driver in response to first lane change information as to whether or not to accept the autonomous control of the two or more successive lane changes.

According to the present invention, it is possible to reduce the load of an action performed by the driver to indicate his/her intention when successively changing lanes.

BRIEF DESCRIPTION OF THE DRAWINGS

FIG. 2 is a diagram illustrating an example of a table used for determination of a travel scene;

FIG. 4A is a set of diagrams illustrating a first presentation form of the lane change information presented during execution of the successive lane change control according to one or more embodiments of the present invention;

FIG. 4B is a set of diagrams illustrating a second presentation form of the lane change information presented during execution of the successive lane change control according to one or more embodiments of the present invention;

FIG. 4C is a set of diagrams illustrating a third presentation form of the lane change information presented during execution of the successive lane change control according to one or more embodiments of the present invention;

FIG. 6C is a flowchart (part 3) illustrating the lane change control process executed by the travel control apparatus for a vehicle according to the present invention;

DETAILED DESCRIPTION

Figure 1:
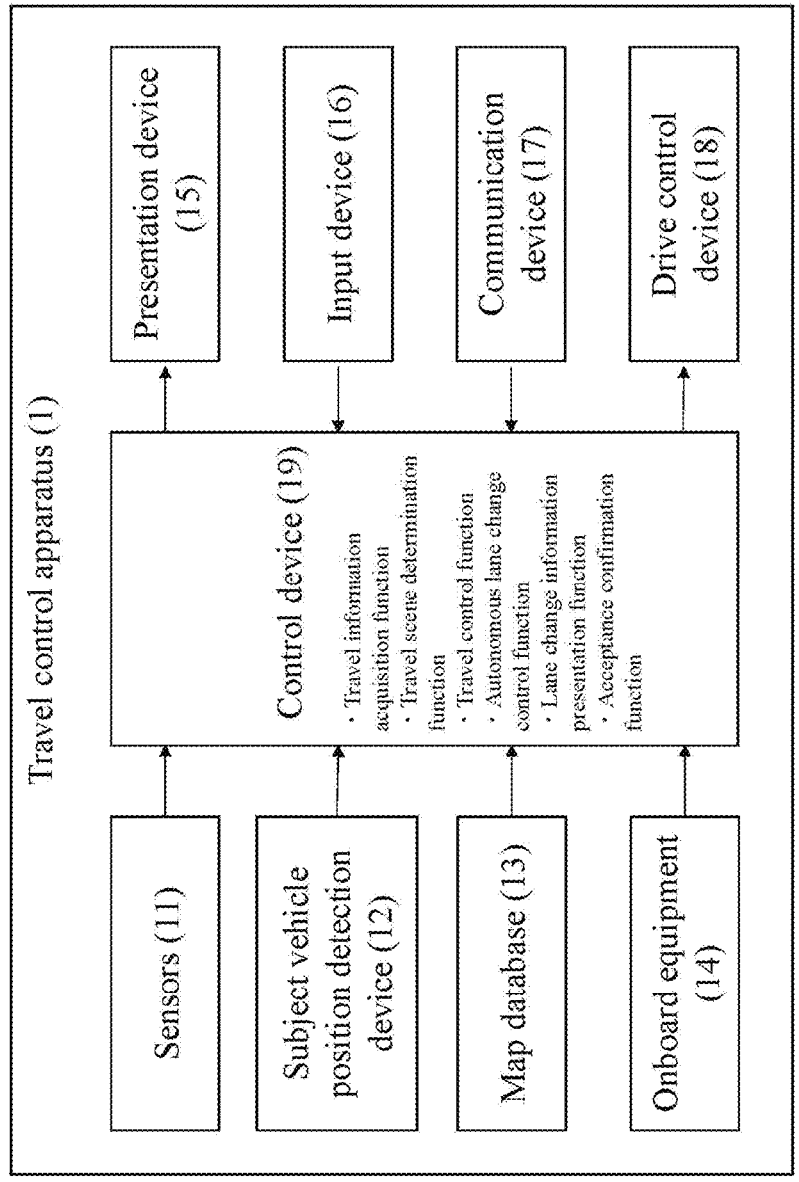
FIG. 1 is a block diagram illustrating an embodiment of the travel control apparatus for a vehicle according to the present invention.

FIG. 1 is a block diagram illustrating the configuration of a travel control apparatus 1 for a vehicle according to one or more embodiments of the present invention. The travel control apparatus 1 for a vehicle according to one or more embodiments of the present invention represents an embodiment of carrying out the travel control method for a vehicle according to the present invention. As illustrated in FIG. 1, the travel control apparatus 1 for a vehicle according to one or more embodiments of the present invention includes sensors 11, a subject vehicle position detection device 12, a map database 13, onboard equipment 14, a presentation device 15, an input device 16, a communication device 17, a drive control device 18, and a control device 19. These devices are connected to one another, for example, via a controller area network (CAN) or other onboard LAN for mutually exchanging information.

The sensors 11 detect a traveling state of the subject vehicle. Examples of the sensors 11 include a front camera that captures images ahead of the subject vehicle, a rear camera that captures images behind the subject vehicle, a front radar that detects obstacles ahead of the subject vehicle, a rear radar that detects obstacles behind the subject vehicle, side radars that detect obstacles existing on the right and left sides of the subject vehicle, a vehicle speed sensor that detects the vehicle speed of the subject vehicle, and an onboard camera that captures images of the driver. The sensors 11 may be represented by one of the above-described various sensors or may also be configured as a combination of two or more sensors. The detection results of the sensors 11 are output to the control device 19 at predetermined time intervals.

The subject vehicle position detection device 12 is composed of a GPS unit, a gyro-sensor, a vehicle speed sensor, and other components. The subject vehicle position detection device 12 detects radio waves transmitted from a plurality of communication satellites using the GPS unit to periodically acquire positional information of a target vehicle (subject vehicle) and detects the current position of the target vehicle on the basis of the acquired positional information of the target vehicle, angle variation information acquired from the gyro-sensor, and the vehicle speed acquired from the vehicle speed sensor. The positional information of the target vehicle detected by the subject vehicle position detection device 12 is output to the control device 19 at predetermined time intervals.

The map database 13 stores map information that includes positional information of various facilities and specific points. Specifically, the map database 13 stores positional information of merging points and branching points on roads, tollgates, positions at which the number of lanes decreases, service areas (SA)/parking areas (PA), etc. together with the map information. The control device 19 can refer to the map information stored in the map database.

The onboard equipment 14 includes various modules equipped in the vehicle and is operated by the driver. Examples of such onboard equipment include a steering, an accelerator pedal, a brake pedal, a navigation device, an audio device, an air conditioner, a hands-free switch, power windows, wipers, lights, flashers, a horn, and specific switches. When the driver operates the onboard equipment 14, its information is output to the control device 19.

The presentation device 15 is, for example, a device such as a display of a navigation device, a display incorporated in a rearview mirror, a display incorporated in a meter unit, a head-up display projected on a windshield, a speaker of an audio device, or a seat device with embedded vibrating bodies. The presentation device 15 informs the driver of presentation information and lane change information, which will be described later, under the control by the control device 19.

The input device 16 is, for example, a device such as a dial switch or a touch panel disposed on a display screen with which the driver can input information by the manual operation or a microphone with which the driver can input information by the voice. In one or more embodiments of the present invention, the driver can operate the input device 16 thereby to input response information in response to the presentation information which is presented by the presentation device 15. For example, in one or more embodiments of the present invention, switches of flashers or other onboard equipment 14 can also be used as the input device 16. More specifically, the input device 16 may be configured such that the driver turns on the switch of a flasher thereby to input acceptance or permission for changing lanes in response to a query as to whether or not the control device 19 autonomously performs changing lanes. The response information which is input via the input device 16 is output to the control device 19.

The communication device 17 performs communication with communication equipment located outside the subject vehicle. For example, the communication device 17 performs vehicle-to-vehicle communication with another vehicle, performs road-to-vehicle communication with equipment provided at a road shoulder, or performs wireless communication with an information server provided outside the vehicle and can thereby acquire various information items from the external equipment. The information acquired by the communication device is output to the control device 19.

The drive control device 18 controls travel of the subject vehicle. For example, when the subject vehicle performs follow-up travel control to follow a preceding vehicle, the drive control device 18 controls the operation of a drive mechanism (which includes the operation of an internal-combustion engine in the case of an engine car and the operation of an electric motor for travel in the case of an electric car and further includes the torque distribution for an internal-combustion engine and an electric motor for travel in the case of a hybrid car) and the braking operation to achieve the acceleration, deceleration, and vehicle speed so that the distance between the subject vehicle and the preceding vehicle is maintained at a constant distance. Additionally or alternatively, when the subject vehicle performs lane keeping control of detecting lane marks of a lane in which the subject vehicle travels (also referred to as a "subject vehicle lane," hereinafter) and controlling the traveling position of the subject vehicle in the road width direction so that the subject vehicle travels in the subject vehicle lane, or when the subject vehicle performs autonomous lane change control such as overtaking of a preceding vehicle or change of the traveling direction, or when the subject vehicle performs travel control of turning right or left at an intersection or the like, the drive control device 18 executes the steering control of the subject vehicle by controlling the operation of the steering actuator in addition to the operation of the drive mechanism and the braking operation for achieving the acceleration, deceleration, and vehicle speed. The drive control device 18 controls travel of the subject vehicle in accordance with commands from the control device 19, which will be described below. Any of other well-known methods can also be used as the travel control method executed by the drive control device 18.

The control device 19 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can also be used as the operation circuit.

The control device 19 executes the programs stored in the ROM using the CPU thereby to achieve a travel information acquisition function of acquiring information regarding a traveling state of the subject vehicle, a travel scene determination function of determining a travel scene of the subject vehicle, a travel control function of controlling travel of the subject vehicle, an autonomous lane change control function of determining whether or not changing lanes is possible and controlling the changing lanes, a lane change information presentation function of presenting the driver with lane change information regarding the travel operation of the subject vehicle executed by the autonomous lane change control, and an acceptance confirmation function of confirming whether or not the driver accepts the changing lanes in response to the presented lane change information. These functions of the control device 19 will be described below.

The travel information acquisition function of the control device 19 is a function of acquiring the travel information regarding the traveling state of the subject vehicle. For example, the control device 19 uses the travel information acquisition function to acquire as the travel information the external image information around the vehicle captured by the front camera and rear camera included in the sensors 11 and/or the detection results by the front radar, rear radar, and side radars included in the sensors 11. Additionally or alternatively, the control device 19 uses the travel information acquisition function to acquire as the travel information the vehicle speed information of the subject vehicle detected by the vehicle speed sensor included in the sensors 11 and/or the image information of the driver's face captured by the onboard camera included in the sensors 11.

Additionally or alternatively, the control device 19 uses the travel information acquisition function to acquire as the travel information the information on the current position of the subject vehicle from the subject vehicle position detection device 12. Additionally or alternatively, the control device 19 uses the travel information acquisition function to acquire as the travel information the positional information of merging points, branching points, tollgates, positions at which the number of lanes decreases, service areas (SA)/parking areas (PA), etc. from the map database 13. In addition, the control device 19 uses the travel information acquisition function to acquire as the travel information the information on an operation of the onboard equipment 14 performed by the driver from the onboard equipment 14.

The travel scene determination function of the control device 19 is a function of referring to a table stored in the ROM of the control device 19 to determine the travel scene in which the subject vehicle is traveling. FIG. 2 is a diagram illustrating an example of the table used for determination of the travel scene. As illustrated in FIG. 2, the table stores travel scenes suitable for changing lanes and the determination condition for each travel scene. The control device 19 uses the travel scene determination function to refer to the table illustrated in FIG. 2 to determine whether or not the travel scene of the subject vehicle is a travel scene suitable for changing lanes.

For example, in the example illustrated in FIG. 2, the determination condition for a "scene of catching up with a preceding vehicle" is defined by four conditions: a condition that "a preceding vehicle exists ahead," a condition of "the vehicle speed of the preceding vehicle<the set vehicle speed of the subject vehicle," a condition of "reaching the preceding vehicle within a predetermined time," and a condition that "the direction of changing lanes is not under a lane change prohibition condition." The control device 19 uses the travel scene determination function to determine whether or not the subject vehicle satisfies the above conditions, for example, on the basis of the detection results by the front camera and/or front radar included in the sensors 11, the vehicle speed of the subject vehicle detected by the vehicle speed sensor included in the sensors 11, the positional information of the subject vehicle detected by the subject vehicle position detection device 12, etc. When the above conditions are satisfied, the control device 19 determines that the subject vehicle is in the "scene of catching up with a preceding vehicle." Likewise, for all other travel scenes registered in the scene determination table illustrated in FIG. 2, the control device 19 uses the travel scene determination function to determine whether or not each determination condition is satisfied.

Examples of the lane change prohibition condition include a condition that "the subject vehicle is traveling in a lane change prohibition area," a condition that "an obstacle exists in the direction of changing lanes," a condition that "the subject vehicle will get across a centerline (road center line)," and a condition that "the subject vehicle will enter a road shoulder or get across a road end." On a road on which emergency stop is permitted at a road shoulder or the like in an "emergency evacuation scene," the condition that "the subject vehicle will enter a road shoulder or get across a road end" may be permitted in the "emergency evacuation scene." In the table illustrated in FIG. 2, the necessity level of changing lanes, the time limit, and the direction of changing lanes will be described later.

When the travel scene of the subject vehicle corresponds to a plurality of travel scenes, the control device 19 uses the travel scene determination function to determine a travel scene having a higher necessity level of changing lanes as the travel scene of the subject vehicle. For example, it is assumed that, in the table illustrated in FIG. 2, the travel scene of the subject vehicle corresponds to a "scene of catching up with a preceding vehicle" and a "scene of lane transfer toward a destination" and the necessity level X1 of changing lanes in the "scene of catching up with a preceding vehicle" is lower than the necessity level X8 of changing lanes in the "scene of lane transfer toward a destination" (X1<X8). In this case, the control device 19 uses the travel scene determination function to determine the "scene of lane transfer toward a destination" with the higher necessity level of changing lanes as the travel scene of the subject vehicle. The "scene of lane transfer toward a destination" refers to a scene of changing lanes for transfer from a lane in which the subject vehicle is currently traveling, such as at a location before a branching point or an exit of a road with multiple lanes, to a lane in the intended branch direction or exit direction.

The travel control function of the control device 19 is a function of controlling travel of the subject vehicle. For example, the control device 19 uses the travel control function to detect lane marks of the subject vehicle lane in which the subject vehicle travels, on the basis of the detection results of the sensors 11 and perform the lane keeping control of controlling the traveling position of the subject vehicle in the road width direction so that the subject vehicle travels in the subject vehicle lane. In this case, the control device 19 uses the travel control function to allow the drive control device 18 to control the operation of the steering actuator and the like so that the subject vehicle travels at an appropriate traveling position. Additionally or alternatively, the control device 19 can also use the travel control function to perform the follow-up travel control of autonomously following a preceding vehicle with a certain distance from the preceding vehicle. When performing the follow-up travel control, the control device 19 uses the travel control function to output control signals to the drive control device 18, which controls the operation of the drive mechanism such as the engine and brake so that the subject vehicle travels with a constant distance between the subject vehicle and the preceding vehicle. In the following description, the autonomous travel control will be described as including the lane keeping control, the follow-up travel control, the right or left turn travel control, and the autonomous lane change control.

The autonomous lane change control function of the control device 19 is a function of determining whether or not to perform changing lanes, on the basis of the travel scene of the subject vehicle and/or information on obstacles existing around the subject vehicle. Additionally or alternatively, the autonomous lane change control function is a function of allowing the drive control device 18 to control the operation of the drive mechanism such as the engine and brake and the operation of the steering actuator when determining to perform changing lanes. Additionally or alternatively, the autonomous lane change control function is a function of setting the start timing of starting the autonomous lane change control on the basis of the traveling state of the subject vehicle and the state of the driver and executing the autonomous lane change control in accordance with the set start timing. Details of the autonomous lane change control using the autonomous lane change control function will be described later.

The lane change information presentation function of the control device 19 is a function of presenting the driver, via the presentation device 15, with lane change information regarding the travel operation of the subject vehicle executed by the lane change control. For example, when a branching point of a road or an exit of an expressway exists ahead during execution of the lane keeping control, changing lanes may be necessary by changing the traveling direction of the subject vehicle. Additionally or alternatively, when a preceding vehicle changes lanes during execution of the follow-up control of following the preceding vehicle, the subject vehicle may also change lanes accordingly. When such lane changes are executed by the autonomous travel control, the control device 19 uses the lane change information presentation function to present the driver with the lane change information in order to encourage the driver to confirm safety by himself/herself. The timing of presenting the lane change information may be at least before the start of the autonomous lane change control because the presentation of the lane change information is for the purpose of safety confirmation by the driver himself/herself, but the lane change information may also be presented during execution of the autonomous lane change control and/or at the time of completion of the autonomous lane change control.

Figure 3:
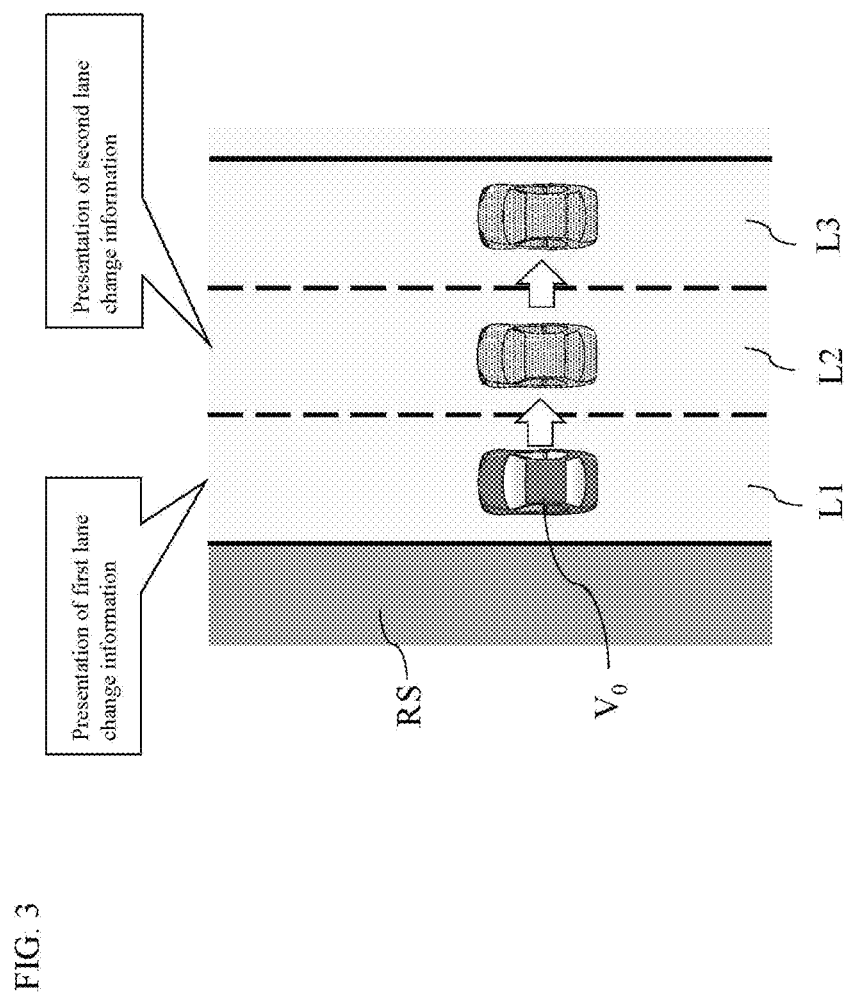
FIG. 3 is a plan view illustrating a scene of successive lane changes according to one or more embodiments of the present invention.

Here, an example of the lane change information presented to the driver before the start of the autonomous lane change control will be described. FIG. 3 is a plan view illustrating a scene of successive lane changes according to one or more embodiments of the present invention, that is, a plan view illustrating an example of the lane keeping control of executing the successive lane changes on a road having three lanes L1, L2, and L3 on each side of the left-hand traffic because a branching point of the road exists ahead. The successive lane changes are executed from the lane L1 in which the subject vehicle $V_0$ is currently traveling to the next adjacent lane L3 via the adjacent lane L2. Although the illustration is omitted, when an exit of the expressway exists ahead and the subject vehicle $V_0$ traveling in the rightmost lane L3 changes the traveling direction toward the exit, the successive lane changes are necessary from the current lane L3 to the leftmost lane L1 via the lane L2. In such a case, the same control is executed.

In one or more embodiments of the present invention, when performing the autonomous control of two or more successive lane changes, the presentation device 15 presents the lane change information, which indicates that the autonomous control of successive lane changes is to be performed, before performing the first lane change. When the driver shows the intention to accept this presentation, the presentation device 15 presents the lane change information, which indicates that the second autonomous lane change control is to be performed, after executing the first autonomous lane change control and before performing the second autonomous lane change control. FIG. 3 illustrates an example of performing two lane changes. Likewise, when performing three or more successive lane changes, the presentation device 15 presents the lane change information, which indicates that the autonomous lane change control is to be performed, before performing the next lane change, and the acceptance made by the driver is confirmed. Thus, the control device 19 according to one or more embodiments of the present invention uses the lane change information presentation function to encourage the driver to confirm safety by himself/herself each time the lane change is performed.

When the presentation device 15 includes a display, the form of presentation on the presentation device 15 using the lane change information presentation function may be a form of display of a visual pattern including an image, a language, etc. Additionally or alternatively, when the presentation device 15 includes a speaker, the autonomous lane change control may be performed to present the driver with the lane change information including the direction of movement of the subject vehicle in the road width direction (e.g., guidance information indicating the lane change in the right or left direction) as audio information (voice or sound). Additionally or alternatively, when the presentation device 15 includes one or more warning lamps installed on the instrument panel or the like, a specific warning lamp may be lit in a specific presentation form thereby to perform the autonomous lane change control to present the driver with the lane change information including the direction of movement of the subject vehicle in the road width direction. Additionally or alternatively, when the presentation device 15 includes a seat device with a plurality of embedded vibrating bodies, a specific vibrating body may be vibrated in a specific presentation form thereby to perform the autonomous lane change control to present the driver with the lane change information including the direction of movement of the subject vehicle in the road width direction.

Thus, instead of or in addition to displaying the lane change information on the display as visual information, presenting the driver with the lane change information as audio information such as voice and sound, as visual information via the display of a warning lamp, or as tactile information via the vibration allows the driver to more intuitively perceive the lane change information. In the travel control apparatus 1 for a vehicle according to one or more embodiments of the present invention, in order to reduce the operation load for confirming the driver's intention of acceptance in response to the lane change information presented on the presentation device 15, the lane change information displayed each time the autonomous lane change control is executed is set in relation to the driver's operation for acceptance as follows.

The acceptance confirmation function of the control device 19 is a function of confirming whether or not the driver accepts changing lanes in response to the lane change information presented using the lane change information presentation function. FIGS. 4A to 4C are sets of diagrams illustrating examples of the driver's action of acceptance in response to various forms of the lane change information presented using the lane change information presentation function. In these examples, the lane change information is presented using the display and speaker of the presentation device 15.

The left diagram of FIG. 4A illustrates the first lane change information presented on the presentation device 15 before starting the successive lane changes from the leftmost lane L1 to the rightmost lane L3 as illustrated in FIG. 3, while the right diagram of FIG. 4A illustrates the second lane change information presented on the presentation device 15 after the first autonomous lane change control is performed and before the second autonomous lane change control is started. In this example, before starting the successive lane changes from the leftmost lane L1 to the rightmost lane L3, as illustrated in the left diagram of FIG. 4A, the display of the presentation device 15 displays the subject vehicle $V_0$ and the front view image data including the lanes L1, L2, and L3 together with a lane change destination of the subject vehicle $V_0$, which is displayed using a visual pattern such as an arrow, and an acceptance button. In addition, along with this display, voice data is output from the speaker, such as "Do you accept the successive lane changes? If you accept the lane changes, please touch the acceptance button." Additionally or alternatively, the voice data may be displayed as character data on the display.

In response to the first lane change information illustrated in the left diagram of FIG. 4A, the driver visually checks the surrounding situation and the like by himself/herself, and in the case of determining to accept the lane changes or in other similar cases, the driver touches the acceptance button. This allows the control device 19 to execute the autonomous lane change control related to the first lane change (lane change from the lane L1 to the lane L2). On the other hand, when the driver's touch on the acceptance button is not detected for some reason, the control device 19 discontinues the autonomous control of successive lane changes including the first autonomous lane change control (lane change from the lane L1 to the lane L2).

When the driver touches the acceptance button in response to the first lane change information illustrated in the left diagram of FIG. 4A and the control device 19 executes the autonomous lane change control related to the first lane change (lane change from the lane L1 to the lane L2), the presentation device 15 presents the second lane change information illustrated in the right diagram of FIG. 4A. In this example, before starting the second lane change from the central lane L2 to the rightmost lane L3, as illustrated in the right diagram of FIG. 4A, the display of the presentation device 15 displays the subject vehicle $V_0$ and the front view image data including the lanes L1, L2, and L3 together with a lane change destination of the subject vehicle $V_0$, which is displayed using a visual pattern such as an arrow, and a cancel button. In addition, along with this display, voice data is output from the speaker, such as "Do you discontinue the lane changes? If you discontinue the lane changes, please touch the cancel button." Additionally or alternatively, the voice data may be displayed as character data on the display.

In response to the second lane change information illustrated in the right diagram of FIG. 4A, the driver visually checks the surrounding situation and the like by himself/herself, and in the case of determining to accept the lane change or in other similar cases, the driver does not touch the cancel button. That is, no operation is performed. This allows the control device 19 to execute the autonomous lane change control related to the second lane change (lane change from the lane L2 to the lane L3) of the originally planned successive lane changes. On the other hand, when the driver's touch on the cancel button is detected for some reason, the control device 19 discontinues the second autonomous lane change control (lane change from the lane L2 to the lane L3).

As described above, regarding the driver's intention of acceptance in response to the lane change information presented on the presentation device 15 illustrated in FIG. 4A, the action load of a second acceptance input in which the driver does not touch the cancel button illustrated in the right diagram of the FIG. 4A (i.e., the driver does nothing) is set smaller than the action load of a first acceptance input in which the driver touches the acceptance button illustrated in the left diagram of FIG. 4A. This can alleviate the driver's operation load for confirmation while encouraging the driver to confirm safety by himself/herself each time the autonomous successive lane change control is performed.

The left diagram of FIG. 4B illustrates the first lane change information presented on the presentation device 15 before starting the autonomous control of successive lane changes from the leftmost lane L1 to the rightmost lane L3 as illustrated in FIG. 3, while the right diagram of FIG. 4B illustrates the second lane change information presented on the presentation device 15 after the first lane change is performed and before the second autonomous lane change control is started. In this example, before starting the autonomous control of successive lane changes from the leftmost lane L1 to the rightmost lane L3, as illustrated in the left diagram of FIG. 4B, the display of the presentation device 15 displays the subject vehicle $V_0$ and the front view image data including the lanes L1, L2, and L3 together with a lane change destination of the subject vehicle $V_0$, which is displayed using a visual pattern such as an arrow. In addition, along with this display, voice data is output from the speaker, such as "Do you accept the successive lane changes? If you accept the lane changes, please operate the blinker lever twice." (the blinker lever may be return-type one, for example). Additionally or alternatively, the voice data may be displayed as character data on the display.

In response to the first lane change information illustrated in the left diagram of FIG. 4B, the driver visually checks the surrounding situation and the like by himself/herself, and in the case of determining to accept the lane changes or in other similar cases, the driver operates the blinker lever twice. This allows the control device 19 to execute the autonomous lane change control related to the first lane change (lane change from the lane L1 to the lane L2). On the other hand, when the driver's double operations on the blinker lever are not detected for some reason, the control device 19 discontinues the autonomous control of successive lane changes including the first autonomous lane change control (lane change from the lane L1 to the lane L2).

When the driver operates the blinker lever twice in response to the first lane change information illustrated in the left diagram of FIG. 4B and the control device 19 executes the autonomous lane change control related to the first lane change (lane change from the lane L1 to the lane L2), the presentation device 15 presents the second lane change information illustrated in the right diagram of FIG. 4B. In this example, voice data may be displayed as character data on the display.

In response to the second lane change information illustrated in the right diagram of FIG. 4B, the driver visually checks the surrounding situation and the like by himself/herself, and in the case of determining to accept the lane change or in other similar cases, the driver operates the blinker lever once. This allows the control device 19 to execute the autonomous lane change control related to the second lane change (lane change from the lane L2 to the lane L3) of the originally planned successive lane changes. On the other hand, when the driver's single operation on the blinker lever is not detected for some reason, the control device 19 discontinues the second autonomous lane change control (lane change from the lane L2 to the lane L3).

As described above, regarding the driver's intention of acceptance in response to the lane change information presented on the presentation device 15 illustrated in FIG. 4B, the action load of a second acceptance input in which the driver operates the blinker lever once as illustrated in the right diagram of the FIG. 4B is set smaller than the action load of a first acceptance input in which the driver operates the blinker lever twice as illustrated in the left diagram of FIG. 4B. This can alleviate the driver's operation load for confirmation while encouraging the driver to confirm safety by himself/herself each time the autonomous successive lane change control is performed. In this example, the first acceptance input is made by operating the blinker lever twice and the second acceptance input is made by operating the blinker lever once, but the specific operation target (blinker lever) and the number of operations (two and one) are merely examples, and the operation target and the number of operations are not limited, provided that the action load of the second acceptance input is set smaller than the action load of the first acceptance input.

The left diagram of FIG. 4C illustrates the first lane change information presented on the presentation device 15 before starting the autonomous control of successive lane changes from the leftmost lane L1 to the rightmost lane L3 as illustrated in FIG. 3, while the right diagram of FIG. 4C illustrates the second lane change information presented on the presentation device 15 after the first lane change is performed and before the second autonomous lane change control is started. In this example, before starting the autonomous control of successive lane changes from the leftmost lane L1 to the rightmost lane L3, as illustrated in the left diagram of FIG. 4C, the display of the presentation device 15 displays the subject vehicle $V_0$ and the front view image data including the lanes L1, L2, and L3 together with a lane change destination of the subject vehicle $V_0$, which is displayed using a visual pattern such as an arrow. In addition, along with this display, voice data is output from the speaker, such as "Do you accept the successive lane changes? If you accept the lane changes, please operate the blinker lever in the direction of changing lanes." (the blinker lever may be return-type one, for example). Additionally or alternatively, the voice data may be displayed as character data on the display.

In response to the first lane change information illustrated in the left diagram of FIG. 4C, the driver visually checks the surrounding situation and the like, and in the case of determining to accept the autonomous lane change control or in other similar cases, the driver operates the blinker lever to the right. This allows the control device 19 to execute the autonomous lane change control related to the first lane change (lane change from the lane L1 to the lane L2). On the other hand, when the driver's rightward operation on the blinker lever is not detected for some reason, the control device 19 discontinues the autonomous control of successive lane changes including the first lane change (lane change from the lane L1 to the lane L2).

When the driver operates the blinker lever to the right in response to the first lane change information illustrated in the left diagram of FIG. 4C and the control device 19 executes the autonomous lane change control related to the first lane change (lane change from the lane L1 to the lane L2), the presentation device 15 presents the second lane change information illustrated in the right diagram of FIG. 4C. In this example, before starting the second autonomous lane change control from the central lane L2 to the rightmost lane L3, as illustrated in the right diagram of FIG. 4C, the display of the presentation device 15 displays the subject vehicle $V_0$ and the front view image data including the lanes L1, L2, and L3 together with a lane change destination of the subject vehicle $V_0$, which is displayed using a visual pattern such as an arrow, and an acceptance button. In addition, along with this display, voice data is output from the speaker, such as "Do you continue the lane changes? If you continue the lane changes, please touch the acceptance button." Additionally or alternatively, the voice data may be displayed as character data on the display.

In response to the second lane change information illustrated in the right diagram of FIG. 4C, the driver visually checks the surrounding situation and the like by himself/herself, and in the case of determining to accept the lane change or in other similar cases, the driver touches the acceptance button. This allows the control device 19 to execute the autonomous lane change control related to the second lane change (lane change from the lane L2 to the lane L3) of the originally planned autonomous control of successive lane changes. On the other hand, when the touch operation on the acceptance button is not detected for some reason, the control device 19 discontinues the second autonomous lane change control (lane change from the lane L2 to the lane L3).

As described above, regarding the driver's intention of acceptance in response to the lane change information presented on the presentation device 15 illustrated in FIG. 4C, the action load of a second acceptance input in which the driver touches the acceptance button illustrated in the right diagram of the FIG. 4C is set smaller than the action load of a first acceptance input in which the driver operates the blinker lever in the direction of changing lanes as illustrated in the left diagram of FIG. 4C. That is, while the operation of the first acceptance input involves determining the directional property of changing lanes, the operation of the second acceptance input does not include the directional property and is an operation of simply touching the button. This can alleviate the driver's operation load for confirmation while encouraging the driver to confirm safety by himself/herself each time the autonomous successive lane change control is performed. In this example, the first acceptance input is made by operating the blinker lever and the second acceptance input is made by touching the button, but the specific operation targets are merely examples, and the operation targets are not limited, provided that the action load of the second acceptance input is set smaller than the action load of the first acceptance input.

The number of successive lane changes illustrated in FIGS. 4A to 4C are two, but when performing autonomous control of three or more successive lane changes, the action load of the second acceptance input for the second lane change may be set smaller than the action load of the first acceptance input for the first lane change, and the action load of the third acceptance input for the third lane change (included in the second acceptance input according to the present invention) may be set further smaller than or equal to the action load of the second acceptance input for the second lane change. That is, the action load of acceptance may be reduced in accordance with the order of the driver's acceptances, or the action loads of the second acceptance and one or more subsequent acceptances may be set to the same level.

Figure 5A:
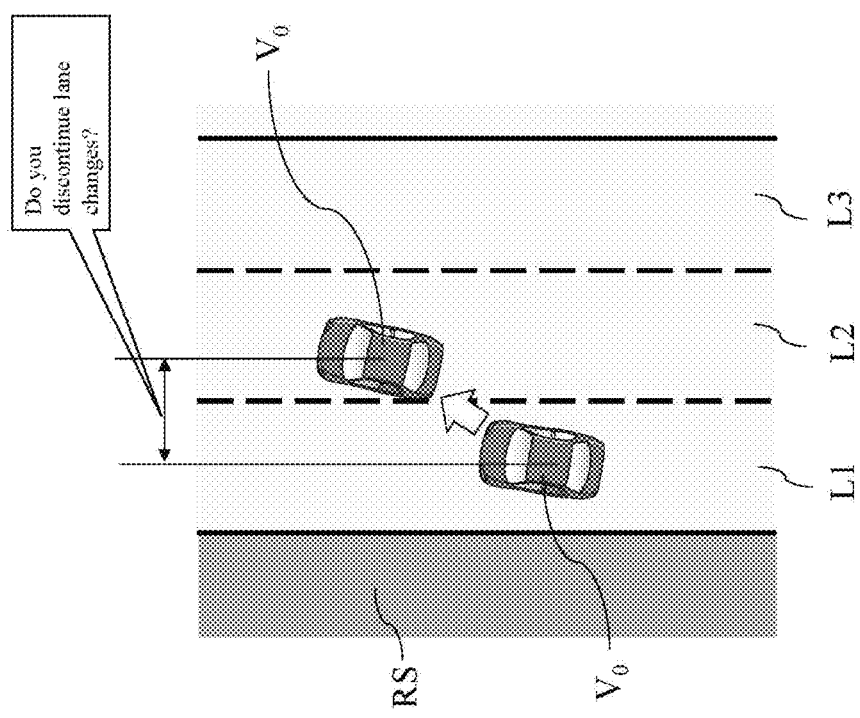
FIG. 5A is a diagram illustrating first presentation timing of the second lane change information presented during execution of the successive lane change control according to one or more embodiments of the present invention.
Figure 5B:
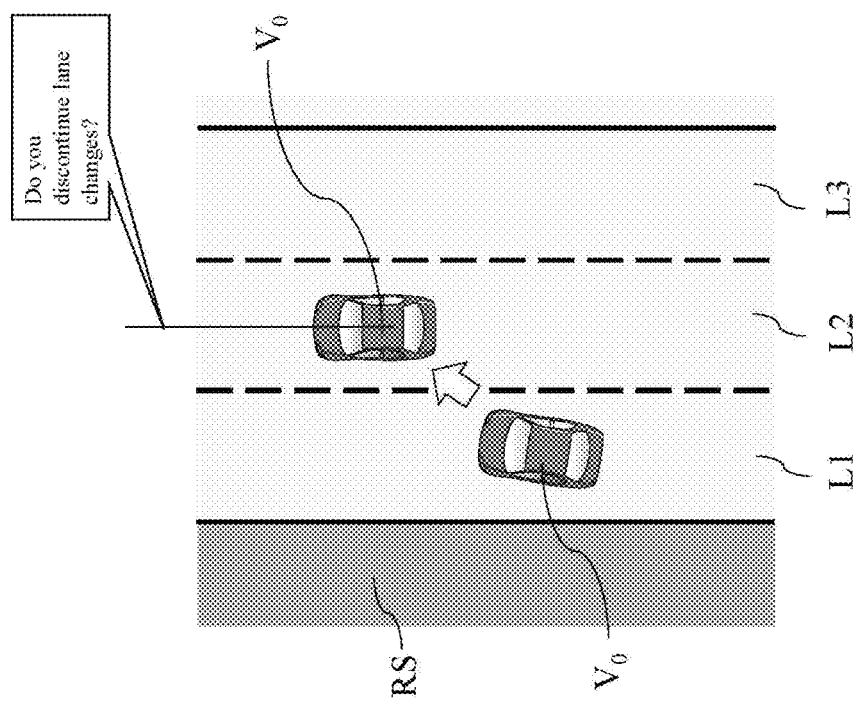
FIG. 5B is a diagram illustrating second presentation timing of the second lane change information presented during execution of the successive lane change control according to one or more embodiments of the present invention.

Regarding the timing of presenting the second lane change information illustrated in each right diagram of FIGS. 4A to 4C, the second lane change information may be presented before the subject vehicle $V_0$ completes the first autonomous lane change control as illustrated in FIG. 5A. Alternatively, as illustrated in FIG. 5B, the second lane change information may be presented after the vehicle $V_0$ completes the first autonomous lane change control. FIGS. 5A and 5B are each a diagram illustrating the presentation timing of the second lane change information presented during execution of the autonomous control of successive lane changes according to one or more embodiments of the present invention.

The timing of presenting the second lane change information illustrated in FIG. 5A is designed such that the second lane change information is presented from when the subject vehicle $V_0$ starts the autonomous lane change control in the leftmost lane L1 to when the subject vehicle $V_0$ completes the autonomous lane change control in the adjacent lane L2, specifically, for example, until the left rear wheel of the subject vehicle $V_0$ gets across the boundary line (lane marks) between the lane L1 and the lane L2. This timing of presenting the second lane change information is neither early nor late timing and it is therefore possible to prevent the delay in the driver's action of the second acceptance input.

On the other hand, the timing of presenting the second lane change information illustrated in FIG. 5B is designed such that the second lane change information is presented after the subject vehicle $V_0$ completes the autonomous lane change control to the adjacent lane L2, specifically, for example, after the subject vehicle $V_0$ starts the lane keeping control in the lane L2 to which the subject vehicle $V_0$ performs the first lane change. Presentation of the second lane change information at this timing allows the driver to more easily confirm the safety around the vehicle.

An autonomous lane change control process according to one or more embodiments of the present invention will now be described with reference to FIGS. 6A to 6E. FIGS. 6A to 6E are flowcharts illustrating the autonomous lane change control process according to one or more embodiments of the present invention. The autonomous lane change control process described below is executed by the control device 19 at predetermined time intervals. The description will be made below on the assumption that it becomes necessary to change lanes to a next adjacent lane (lane further beyond the adjacent lane) for a preliminarily input destination while the control device 19 uses the travel control function to perform the lane keeping control of controlling the traveling position of the subject vehicle in the road width direction so that the subject vehicle travels in the subject vehicle lane.

Figure 6A:
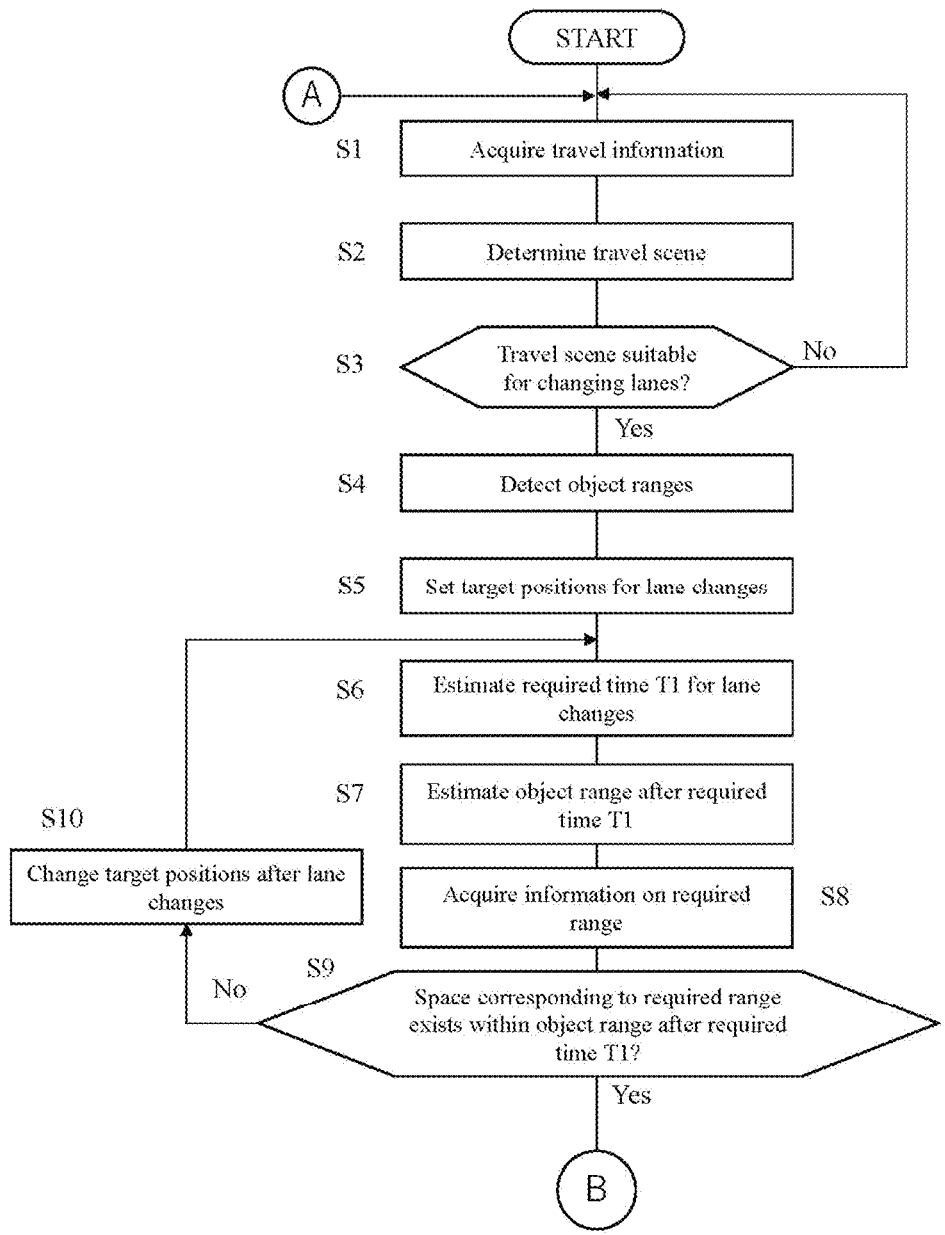
FIG. 6A is a flowchart (part 1) illustrating a lane change control process executed by the travel control apparatus for a vehicle according to the present invention.

First, in step S1 of FIG. 6A, the control device 19 uses the travel information acquisition function to acquire the travel information regarding the traveling state of the subject vehicle. Step S1 is followed by step S2, in which the control device 19 uses the travel scene determination function to determine the travel scene of the subject vehicle on the basis of the travel information acquired in step S1.

In step S3, the control device 19 uses the travel scene determination function to determine whether or not the travel scene of the subject vehicle determined in step S2 is a travel scene suitable for changing lanes. Specifically, when the travel scene of the subject vehicle is any of travel scenes illustrated in FIG. 2, the travel scene determination function is used to determine that the travel scene of the subject vehicle is a travel scene suitable for changing lanes. When the travel scene of the subject vehicle is not a travel scene suitable for changing lanes, the process returns to step S1, from which the determination of the travel scene is repeated. When the travel scene of the subject vehicle is a travel scene suitable for changing lanes, the process proceeds to step S4.

In step S4, the control device 19 uses the autonomous lane change control function to detect object ranges. Specifically, the control device 19 uses the autonomous lane change control function to detect obstacles existing around the subject vehicle on the basis of the external image information around the vehicle captured by the front camera and rear camera included in the sensors 11 and/or the travel information including the detection results by the front radar, rear radar, and side radars included in the sensors 11. Then, the control device 19 uses the autonomous lane change control function to detect ranges that are located on a side of the subject vehicle and in which no obstacles exist, as the object ranges.

The "object ranges" in one or more embodiments of the present invention refer to relative ranges with reference to the traveling position when the subject vehicle travels at the current speed; therefore, when another vehicle existing around the subject vehicle travels straight ahead at the same speed as the subject vehicle, the object ranges do not vary. The "side of the subject vehicle" refers to a range in which the position on the side of the subject vehicle can be taken as a target position for changing lanes when the subject vehicle changes lanes (this target position is also a relative position with reference to the traveling position when the subject vehicle travels at the current speed), and this range (such as direction, size, and angle) can be set as appropriate. Methods of detecting object ranges OS will be described below with reference to FIGS. 7A to 7F. FIGS. 7A to 7F are plan views for describing object ranges.

Figure 7A:
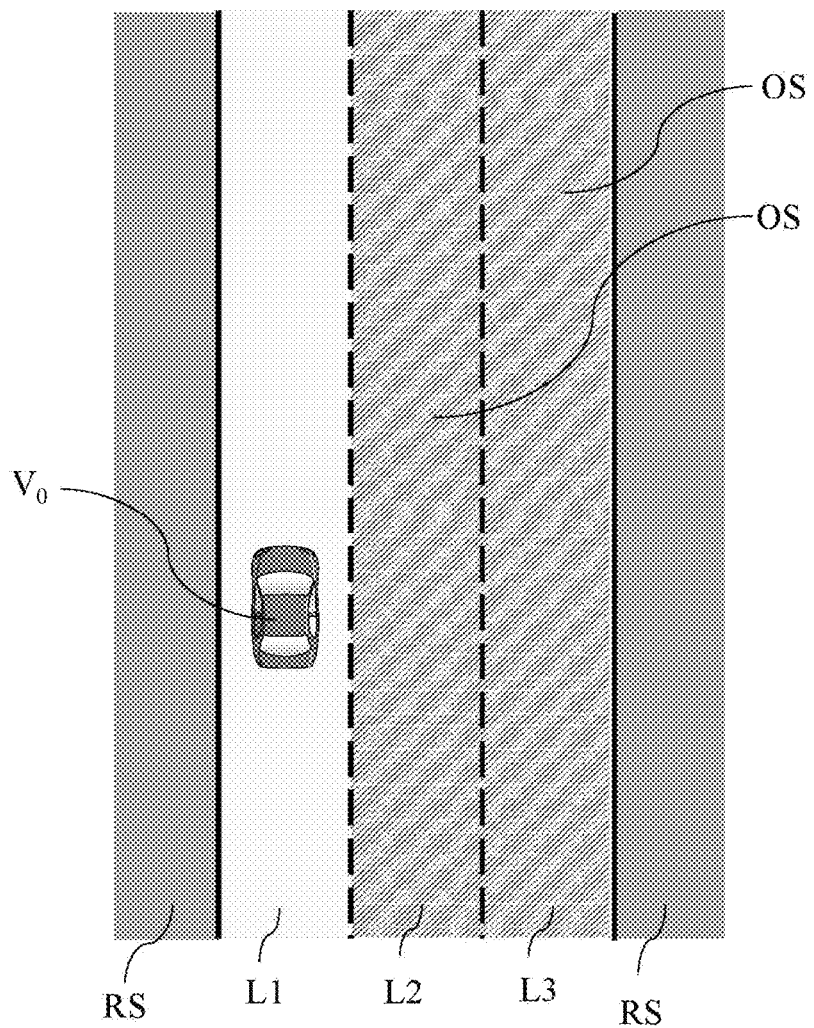
FIG. 7A is a plan view (part 1) for describing a method of detecting object ranges executed by the travel control apparatus for a vehicle according to the present invention.

In an example of a scene illustrated in FIG. 7A, another vehicle $V_1$ that is an obstacle does not exist neither in an adjacent lane L2 adjacent to a lane L1 in which the subject vehicle $V_0$ travels nor in a lane L3 further beyond the adjacent lane L2 (the lane L3 will also be referred to as a next adjacent lane L3, hereinafter). In this case, the control device 19 uses the autonomous lane change control function to detect the adjacent lane L2 and the next adjacent lane L3 as object ranges OS. Note that road shoulders RS are excluded from the object ranges OS because the road shoulders RS are basically within ranges in which changing lanes cannot be performed. Note, however, that when the travel scene of the subject vehicle $V_0$ is an "emergency evacuation scene" on a road on which emergency stop or the like is permitted at the road shoulders RS, the road shoulders RS can be included in the object ranges OS (here and hereinafter).

Figure 7B:
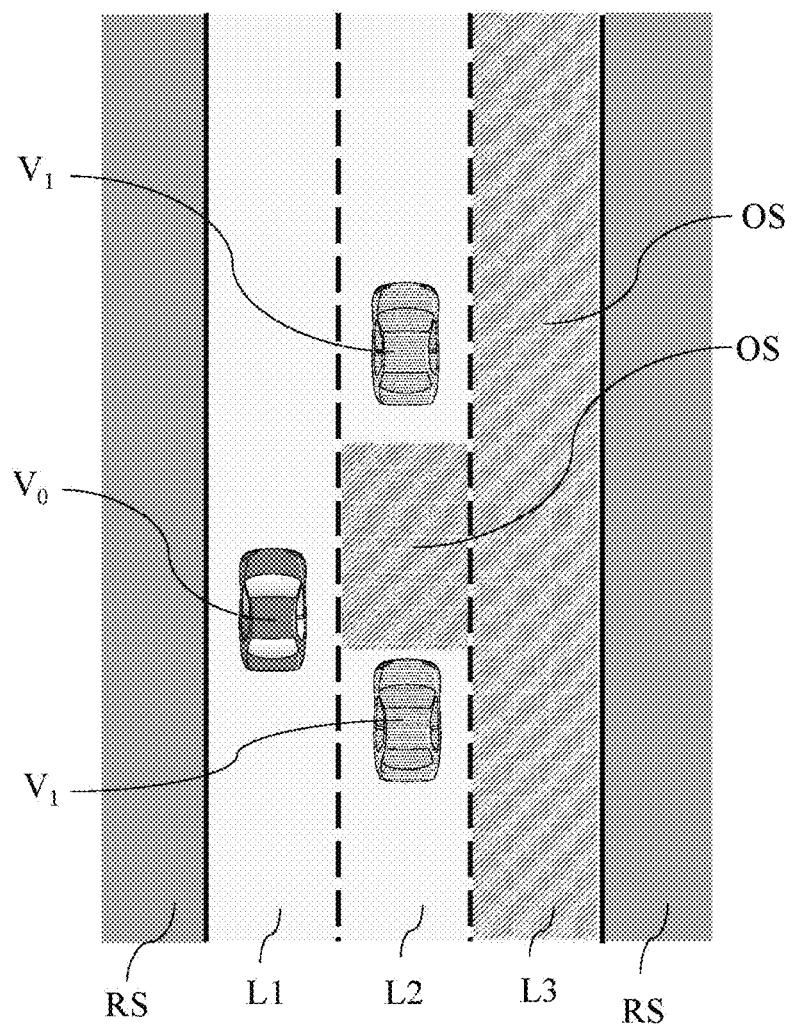
FIG. 7B is a plan view (part 2) for describing a method of detecting object ranges executed by the travel control apparatus for a vehicle according to the present invention.

In an example of a scene illustrated in FIG. 7B, other vehicles $V_1$ and $V_1$ that are obstacles exist in the adjacent lane L2 adjacent to the lane L1 in which the subject vehicle $V_0$ travels, but a range in which no other vehicles exist is present in the adjacent lane L2 between the front other vehicle $V_1$ traveling ahead of a space adjacent to the lane L1 in which the subject vehicle $V_0$ travels and the rear other vehicle $V_1$ traveling behind that space, and no other vehicles exist as obstacles in the next adjacent lane L3. The control device 19 uses the autonomous lane change control function to detect, as the object ranges OS, the next adjacent lane L3 and the range of the adjacent lane L2 in which no other vehicles exist.

Figure 7C:
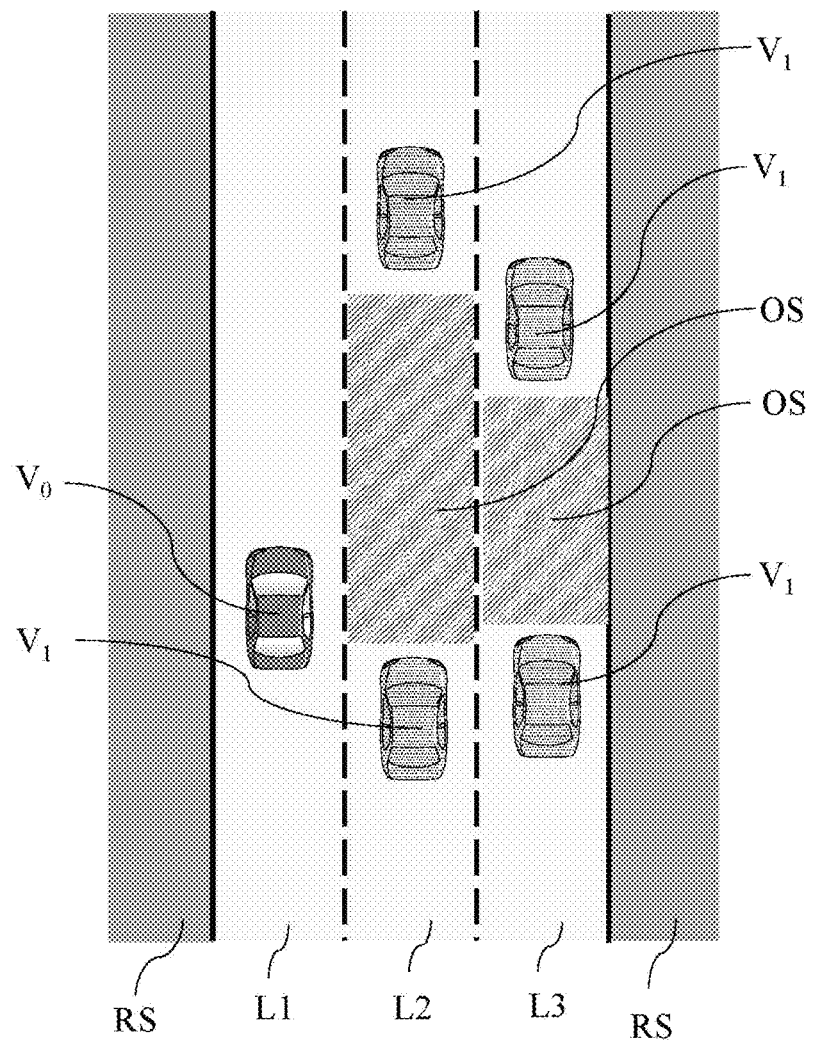
FIG. 7C is a plan view (part 3) for describing a method of detecting object ranges executed by the travel control apparatus for a vehicle according to the present invention.

In an example of a scene illustrated in FIG. 7C, a range in which no other vehicles exist is present in the adjacent lane L2 as in the example illustrated in FIG. 7B, and a range in which no other vehicles exist is also present in the next adjacent lane L3 between the front other vehicle $V_1$ and the rear other vehicle $V_1$. In this case, the control device 19 uses the autonomous lane change control function to detect, as the object ranges OS, the range in the adjacent lane L2 in which no other vehicles exist and the range in the next adjacent lane L3 in which no other vehicles exist.

Figure 7D:
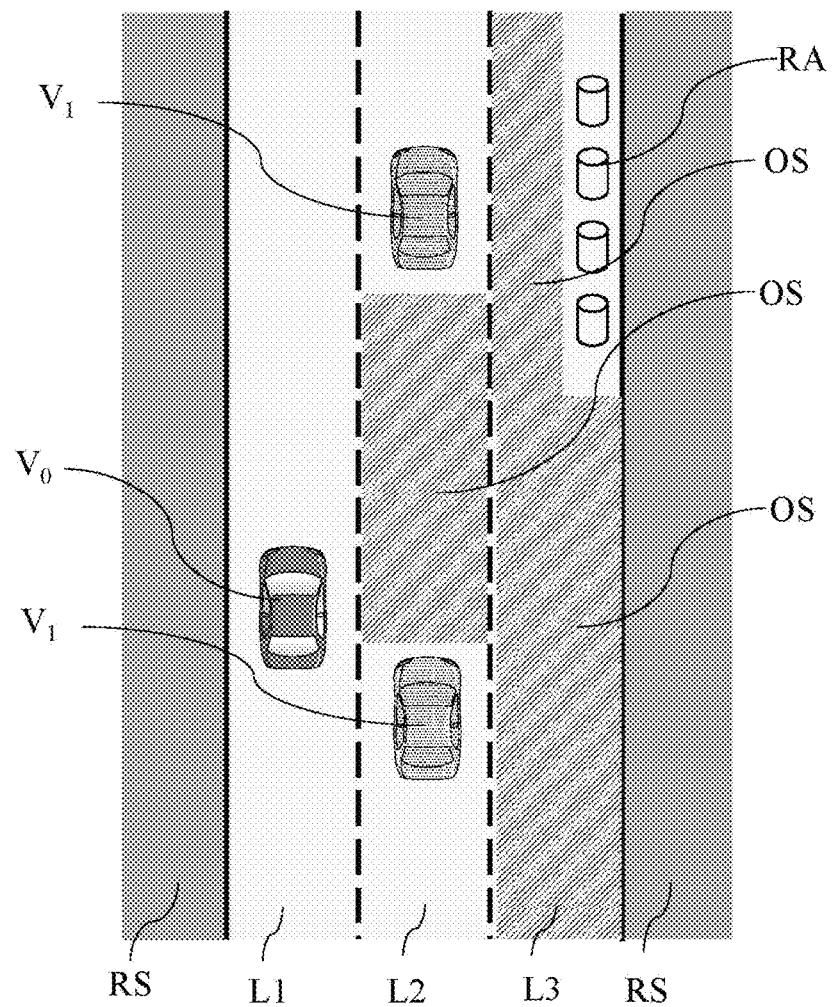
FIG. 7D is a plan view (part 4) for describing a method of detecting object ranges executed by the travel control apparatus for a vehicle according to the present invention.

In an example of a scene illustrated in FIG. 7D, a range in which no other vehicles exist is present in the adjacent lane L2 as in the example illustrated in FIG. 7B, and no other vehicles exist in the next adjacent lane L3, but the next adjacent lane L3 includes a range RA, such as a construction section or a space occupied by a damaged vehicle, in which the subject vehicle $V_0$ cannot travel. In this case, the control device 19 uses the autonomous lane change control function to detect the object ranges OS by excluding the range RA, such as a construction section or a space occupied by a damaged vehicle, in which the subject vehicle $V_0$ cannot travel, from the object ranges OS. Examples of the range RA in which the subject vehicle $V_0$ cannot travel include, in addition to a construction section, a range in which another vehicle $V_1$ parks or stops and a range in which vehicles are prohibited from traveling due to traffic regulation or the like. As illustrated in FIG. 7D, when the range RA in which the subject vehicle $V_0$ cannot travel due to a construction section or the like occupies half or more of the next adjacent lane L3 (half or more in the road width direction), for example, the remaining less than half of the range may be excluded from the object ranges OS.

Figure 7E:
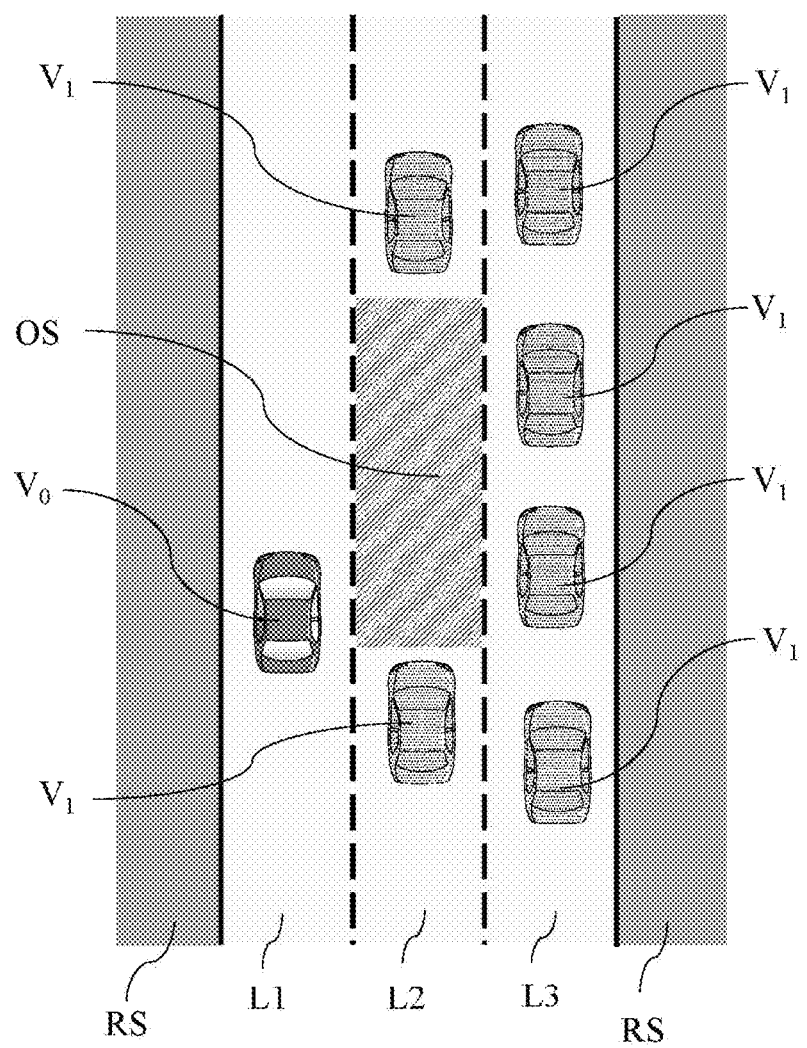
FIG. 7E is a plan view (part 5) for describing a method of detecting object ranges executed by the travel control apparatus for a vehicle according to the present invention.

In an example of a scene illustrated in FIG. 7E, a range in which no other vehicles exist is present in the adjacent lane L2, but other vehicles $V_1$ are traveling in series in the next adjacent lane L3, and the next adjacent lane L3 does not include a space to which changing lanes is possible. In this case, the control device 19 uses the autonomous lane change control function to determine that the object ranges OS cannot be detected.

Figure 7F:
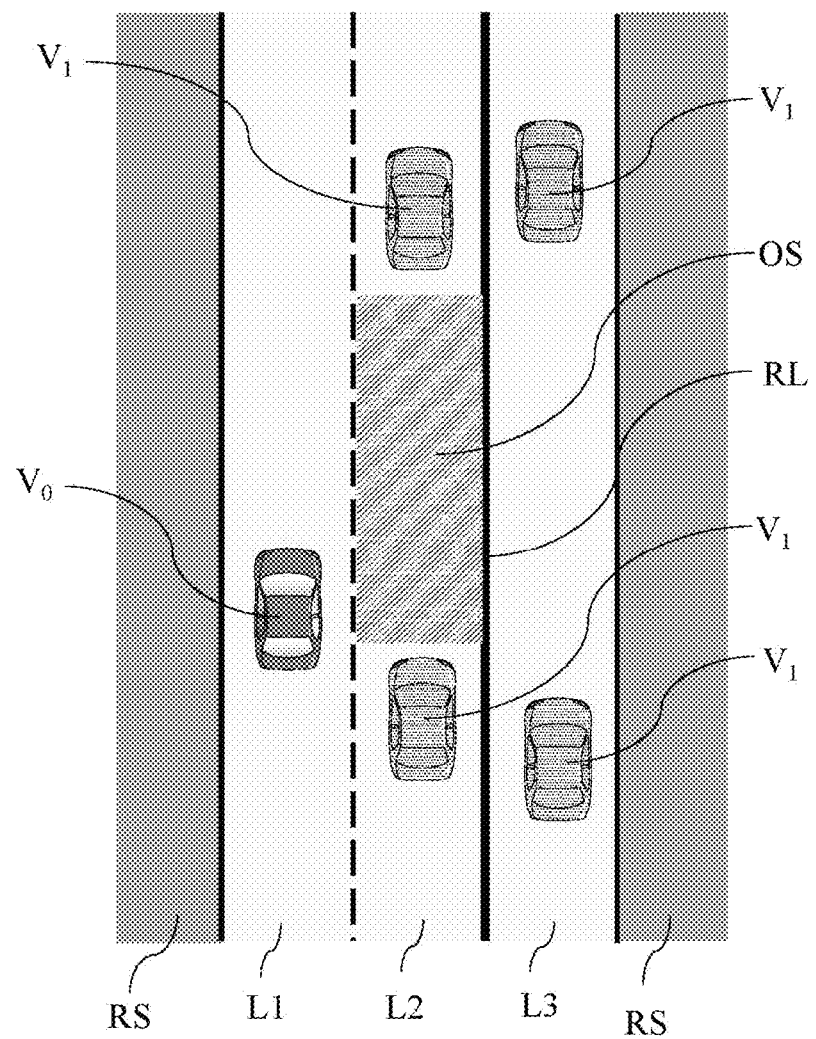
FIG. 7F is a plan view (part 6) for describing a method of detecting object ranges executed by the travel control apparatus for a vehicle according to the present invention.

In an example of a scene illustrated in FIG. 7F, lane change from the adjacent lane L2 to the next adjacent lane L3 is prohibited by a mark RL indicating the prohibition of lane change. On such a road, the control device 19 uses the autonomous lane change control function to determine that the object ranges OS cannot be detected.

The control device 19 in one or more embodiments of the present invention uses the autonomous lane change control function to detect the object ranges OS in a direction, among right and left directions, which is suitable for changing lanes in the travel scene of the subject vehicle $V_0$. In one or more embodiments of the present invention, the direction suitable for changing lanes in each travel scene is preliminarily stored in the table illustrated in FIG. 2. The control device 19 uses the autonomous lane change control function to refer to the table illustrated in FIG. 2 to acquire information on the "direction of changing lanes" in the travel scene of the subject vehicle. For example, when the travel scene of the subject vehicle is a "scene of lane transfer toward the destination," the control device 19 uses the autonomous lane change control function to refer to the table of FIG. 2 to acquire a direction "toward the lane side for heading to the destination" as the "direction of changing lanes." Then, the control device 19 uses the autonomous lane change control function to detect the object ranges OS in the acquired "direction of changing lanes."

Additionally or alternatively, the control device 19 uses the autonomous lane change control function to detect the object ranges OS on a side of the subject vehicle $V_0$. For example, even when ranges in which no obstacles exist are detected in the adjacent lane L2 and the next adjacent lane L3, if the ranges are separate from the current position of the subject vehicle $V_0$ by a certain distance or more and located behind or ahead of the subject vehicle, it may be difficult to change lanes to such ranges, which are therefore not detected as the object ranges OS.

Figure 8:
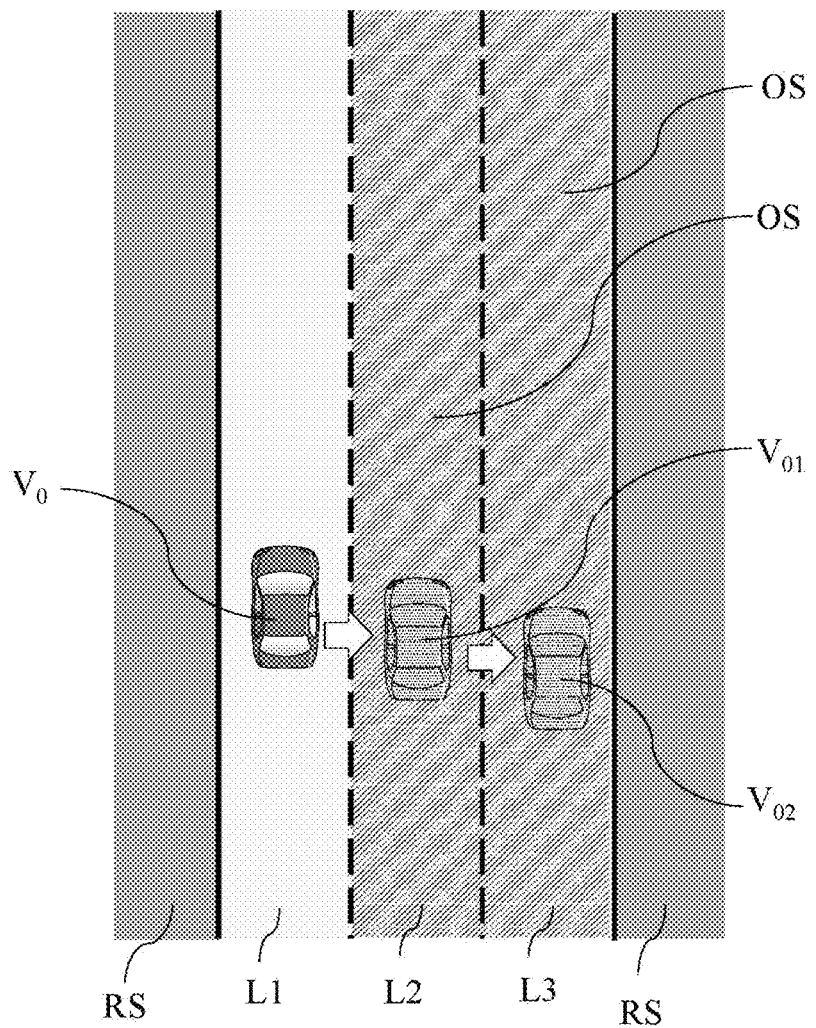
FIG. 8 is a plan view for describing a method of setting target positions for lane changes, wherein the method is executed by the travel control apparatus for a vehicle according to the present invention.

Referring again to FIG. 6A, in step S5, the control device 19 uses the autonomous lane change control function to set target positions for lane changes. FIG. 8 is a diagram for describing a method of setting the target positions for lane changes. For example, as illustrated in FIG. 8, the control device 19 uses the autonomous lane change control function to set a position that is within the object range OS in the adjacent lane L2 detected in step S4 and that is shifted backward from the position of the subject vehicle $V_0$ by a small distance and a position that is within the object range OS in the next adjacent lane L3 detected in step S4 and that is shifted backward from the position of the subject vehicle $V_0$ by a small distance, as the target positions for lane changes (e.g., the positions of vehicles $V_{01}$ and $V_{02}$ illustrated in FIG. 8). The target positions for lane changes (positions of the vehicles $V_{01}$ and $V_{02}$) are relative positions with respect to the position at which the subject vehicle $V_0$ travels. That is, provided that the position when the subject vehicle $V_0$ travels at the current speed without changing the speed is a reference position, positions located laterally behind the reference position by a small distance are set as the target positions for lane changes. This allows the subject vehicle $V_0$ to change lanes to the next adjacent lane L3 via the adjacent lane L2 without accelerating the subject vehicle $V_0$ when the subject vehicle $V_0$ moves to the target positions for lane changes.

The control device 19 may use the autonomous lane change control function to set the target positions for lane changes by taking into account the ease of lane changes, such as a situation that the object ranges OS in the adjacent lane L2 and the next adjacent lane L3 include a range to which the subject vehicle $V_0$ can move and a situation that another vehicle $V_1$ that may enter an object range OS does not exist around the subject vehicle $V_0$. For example, when another vehicle $V_1$ existing around an object range OS lights the blinkers toward the object range OS and/or travels while deviating toward the object range OS side, the autonomous lane change control function is used to determine that the other vehicle $V_1$ may enter the object range OS. In this case, another position in an object range OS which the other vehicle $V_1$ is less likely to enter may be set as a target position. In the above exemplary case, the target positions for lane changes are set at positions located behind the subject vehicle $V_0$ and within the object ranges OS in the adjacent lane L2 and the next adjacent lane L3. In an alternative embodiment, the target positions for lane changes may be set at positions located ahead of the subject vehicle $V_0$ and within the object ranges OS in the adjacent lane L2 and the next adjacent lane L3. In an alternative embodiment, step S5 may include setting target routes for performing lane changes instead of setting the target positions for lane changes.

Referring again to FIG. 6A, in step S6, the control device 19 uses the autonomous lane change control function to estimate a required time T1 for the lane changes. For example, the control device 19 uses the autonomous lane change control function to estimate a time required for the subject vehicle to move from the current position to a target position for the lane changes as the required time T1 on the basis of the vehicle speed and/or acceleration of the subject vehicle. Accordingly, when the width of a lane is wide, when the road is congested, or when successive lane changes are performed as in this example, for example, the required time T1 is estimated as a long time.

In step S7, the control device 19 uses the autonomous lane change control function to estimate an object range OS after the required time T1 estimated in step S6. Specifically, the control device 19 uses the autonomous lane change control function to estimate the traveling position after the required time T1 of another vehicle $V_1$ existing around the subject vehicle $V_0$ on the basis of the vehicle speed and acceleration of the other vehicle $V_1$. For example, the control device 19 uses the autonomous lane change control function to repeatedly detect the positional information of the other vehicle $V_1$ thereby to calculate the speed vector $v_0$, acceleration vector $a_0$, and positional vector $p_0$ of the other vehicle $V_1$, as illustrated in FIG. 9A.

Figure 9A:
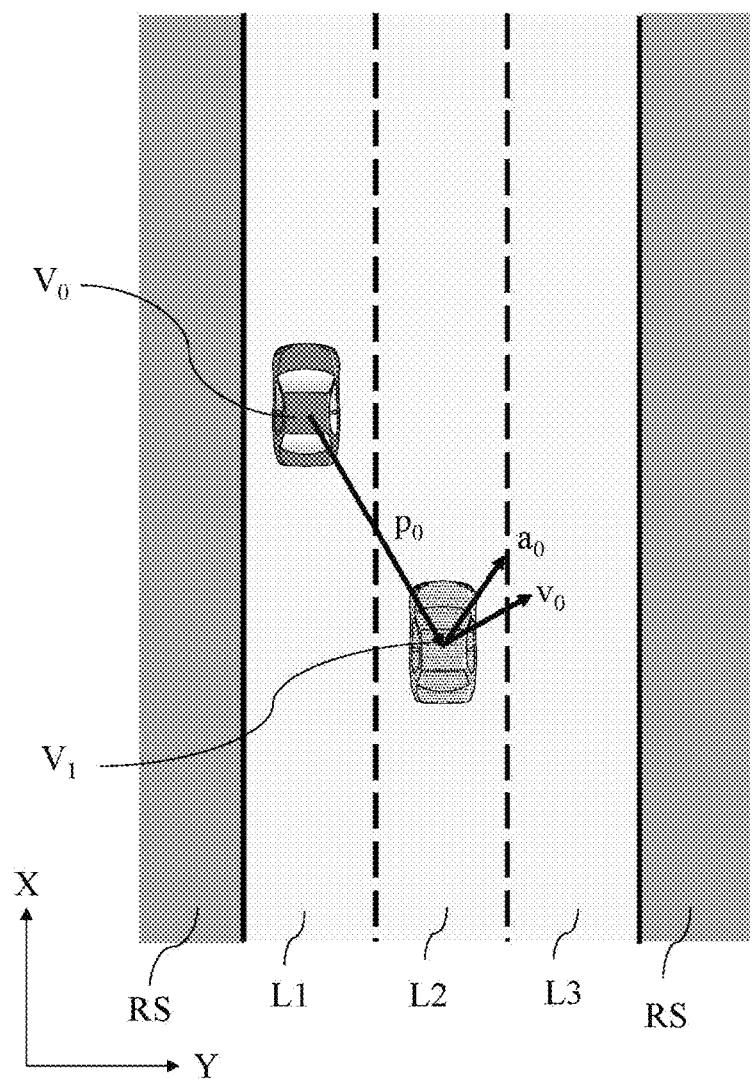
FIG. 9A is a plan view (part 1) for describing a method of estimating the position of another vehicle after a required time, wherein the method is executed by the travel control apparatus for a vehicle according to the present invention.

As illustrated in FIG. 9A, when the traveling direction of the subject vehicle $V_0$ is along X-axis and the road width direction is along Y-axis, the speed vector $v_0$ of the other vehicle $V_1$ is represented by the following equation (1).

$$v_0 = vx_0 i + vy_0 j \qquad (1)$$

In the above equation (1), $vx_0$ represents a speed component in the X-axis direction of the speed vector $v_0$ of the other vehicle $V_1$ and $vy_0$ represents a speed component in the Y-axis direction of the speed vector $v_0$ of the other vehicle $V_1$. In the above equation (1), i represents a unit vector in the X-axis direction and j represents a unit vector in the Y-axis direction (the same applies to the following equations (2), (3), and (6)).

The acceleration vector $a_0$ of the other vehicle $V_1$ can be obtained as represented by the following equation (2) while the positional vector $p_0$ of the other vehicle $V_1$ can be obtained as represented by the following equation (3).

$$a_0 = ax_0 i + ay_0 j \qquad (2)$$

$$p_0 = px_0 i + py_0 j \qquad (3)$$

In the above equation (2), $ax_0$ represents an acceleration component in the X-axis direction of the acceleration vector $a_0$ of the other vehicle $V_1$ and $ay_0$ represents an acceleration component in the Y-axis direction of the acceleration vector $a_0$ of the other vehicle $V_1$. In the above equation (3), $px_0$ represents a positional component in the X-axis direction of the positional vector $p_0$ of the other vehicle $V_1$ and $py_0$ represents a positional component in the Y-axis direction of the positional vector $p_0$ of the other vehicle $V_1$.

Figure 9B:
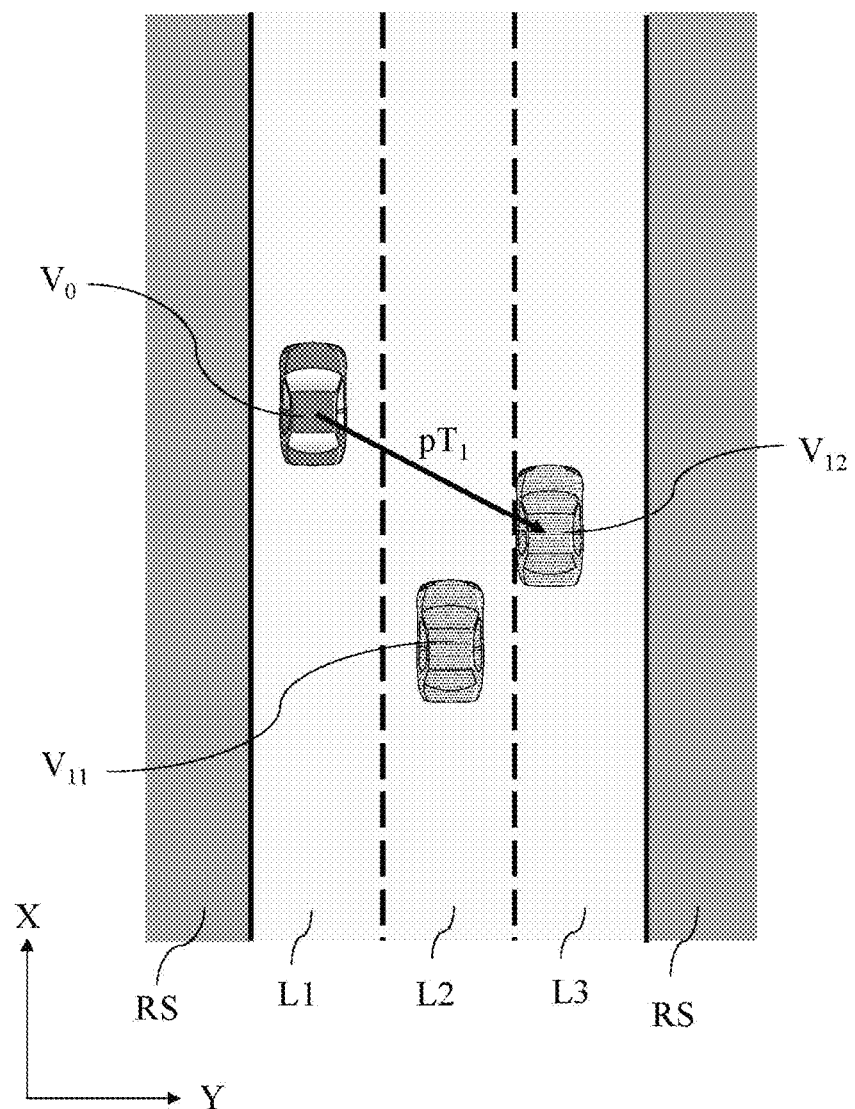
FIG. 9B is a plan view (part 2) for describing a method of estimating the position of another vehicle after a required time, wherein the method is executed by the travel control apparatus for a vehicle according to the present invention.

Then, the control device 19 uses the autonomous lane change control function to calculate a positional vector pT1 after the required time T1 of the other vehicle $V_1$, as illustrated in FIG. 9B. Specifically, the control device 19 uses the autonomous lane change control function to calculate the positional vector pT1 after the required time T1 of the other vehicle $V_1$ on the basis of the following equations (4) to (6).

$$pxT_1 = px_0 + vx_0 T1 + \tfrac{1}{2}(ax_0 T1)^2 \qquad (4)$$

$$pyT_1 = py_0 + vy_0 T1 + \tfrac{1}{2}(ay_0 T1)^2 \qquad (5)$$

$$pT_1 = pxT_1 i + pyT_1 j \qquad (6)$$

In the above equations (4) and (5), $pxT_1$ represents a positional component in the X-axis direction of the positional vector $pT_1$ after the required time T1 of the other vehicle $V_1$, $pyT_1$ represents a positional component in the Y-axis direction of the positional vector pT1 after the required time T1 of the other vehicle $V_1$, $vx_0 T1$ represents a moving speed in the X-axis direction of the other vehicle $V_1$ after the required time T1, $vy_0 T1$ represents a moving speed in the Y-axis direction of the other vehicle $V_1$ after the required time T1, $ax_0 T1$ represents acceleration in the X-axis direction of the other vehicle $V_1$ after the required time T1, and $ay_0 T1$ represents acceleration in the Y-axis direction of the other vehicle $V_1$ after the required time T1.

The control device 19 uses the autonomous lane change control function to estimate positions after the required time T1 of all other vehicles $V_1$ existing around the subject vehicle $V_0$. Then, the control device 19 uses the autonomous lane change control function to estimate an object range OS after the required time T1 on the basis of the positions after the required time T1 of the other vehicles $V_1$. The control device 19 uses the autonomous lane change control function to estimate an object range OS after the required time T1 by taking into account the situation of lane regulation after the required time T1, existence of obstacles on the road, presence or absence of obstruction in the adjacent lane L2 and the next adjacent lane L3, and existence of a section, such as a construction section, to which the subject vehicle cannot move. The control device 19 can use the autonomous lane change control function to estimate an object range OS after the required time T1 as in step S4.

In step S8, the control device 19 uses the autonomous lane change control function to acquire information on a required range RR. The required range RR refers to a range having a size necessary for the subject vehicle $V_0$ to change lanes, or a range having a size that is at least equal to or larger than a size which the subject vehicle $V_0$ occupies on the road surface. In one or more embodiments of the present invention, when a required range RR is set at the target position for changing lanes and the object range OS in each of the adjacent lane L2 and the next adjacent lane L3 includes the required range RR, a determination is made that a space corresponding to the required range RR exists within the object range OS in each of the adjacent lane L2 and the next adjacent lane L3, and changing lane is permitted. In one or more embodiments of the present invention, the memory of the control device 19 stores information including the shape and size of a required range RR, and the autonomous lane change control function is used to acquire the information on the required range RR from the memory of the control device 19.

Figure 10A:
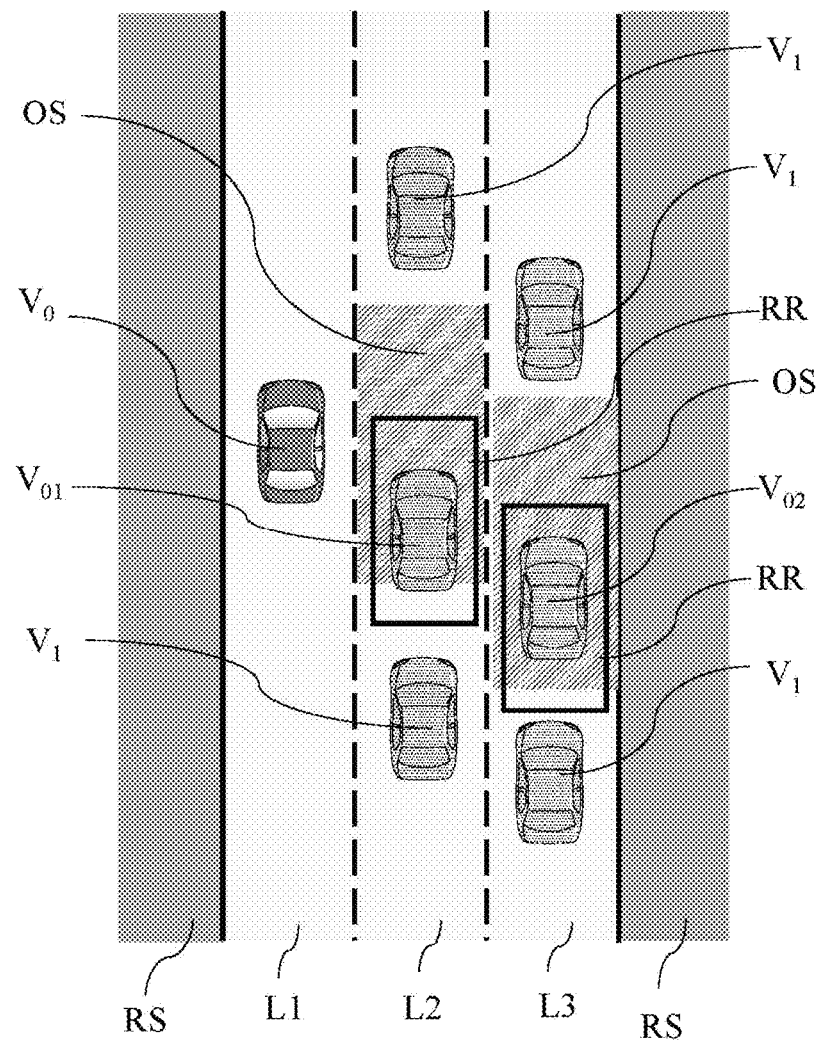
FIG. 10A is a plan view (part 1) for describing a method of determining whether or not changing lanes is possible, wherein the method is executed by the travel control apparatus for a vehicle according to the present invention.

In step S9, the control device 19 uses the autonomous lane change control function to determine whether or not there is a space within the object range OS in each of the adjacent lane L2 and the next adjacent lane L3 after the required time T1. The space corresponds to the required range RR acquired in step S8. The object range OS in each of the adjacent lane L2 and the next adjacent lane L3 after the required time T1 is estimated in step S7. Specifically, as illustrated in FIG. 10A, the control device 19 uses the autonomous lane change control function to set the required range RR at the target position for changing lanes (position of the subject vehicle $V_0$) which is set in step S5. Then, the control device 19 uses the autonomous lane change control function to determine whether or not the object range OS in each of the adjacent lane L2 and the next adjacent lane L3 after the required time T1 includes the required range RR.

Figure 10B:
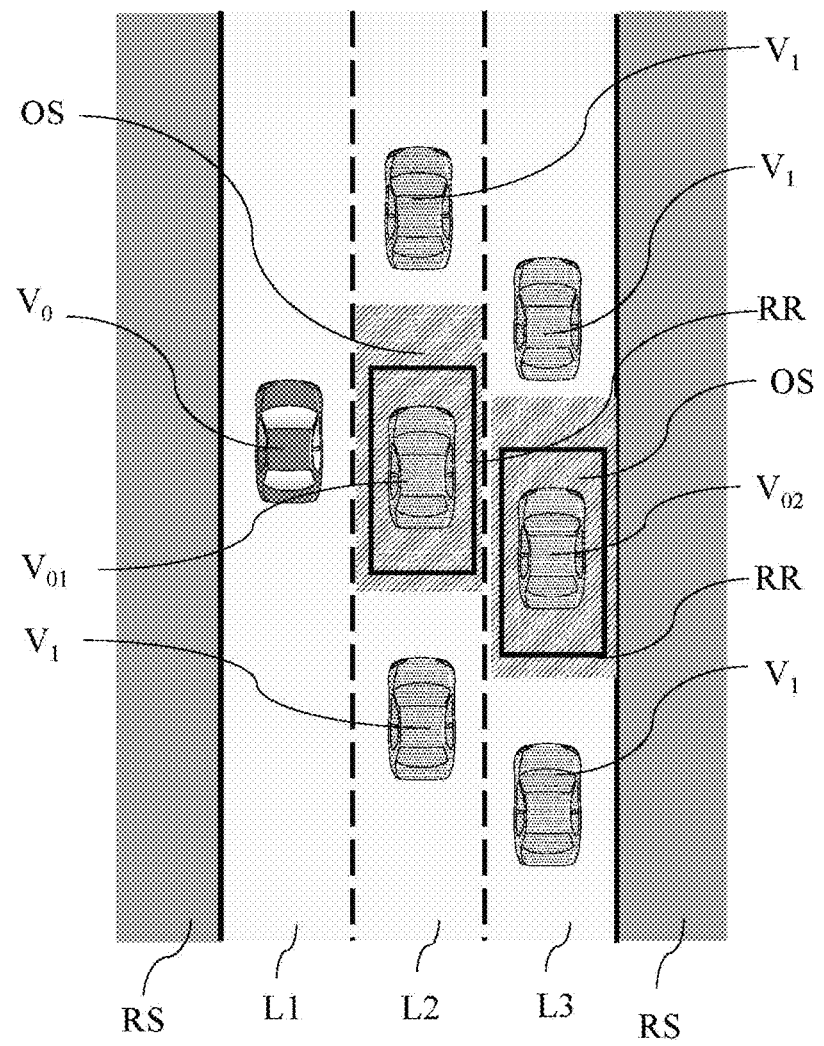
FIG. 10B is a plan view (part 2) for describing a method of determining whether or not changing lanes is possible, wherein the method is executed by the travel control apparatus for a vehicle according to the present invention.

For example, in the example illustrated in FIG. 10A, the object range OS in each of the adjacent lane L2 and the next adjacent lane L3 after the required time T1 does not include the rear portion of the required range RR. The control device 19 therefore uses the autonomous lane change control function to determine that there is not a space corresponding to the required range RR within the object range OS in each of the adjacent lane L2 and the next adjacent lane L3 after the required time T1. On the other hand, as illustrated in FIG. 10B, when the object range OS in each of the adjacent lane L2 and the next adjacent lane L3 after the required time T1 includes the required range RR, the control device 19 uses the autonomous lane change control function to determine that there is a space corresponding to the required range RR within the object range OS in each of the adjacent lane L2 and the next adjacent lane L3 after the required time T1. When there is a space corresponding to the required range RR within the object range OS in each of the adjacent lane L2 and the next adjacent lane L3 after the required time T1, the process proceeds to step S11 illustrated in FIG. 6B, while when there is no space, the process proceeds to step S10.

In step S10, a determination has been made that the object range OS in each of the adjacent lane L2 and the next adjacent lane L3 after the required time T1 does not include the required range RR and a space cannot be detected which corresponds to the required range RR within the object range OS in each of the adjacent lane L2 and the next adjacent lane L3 after the required time T1. In step S10, therefore, the control device 19 uses the autonomous lane change control function to change the target positions for lane changes. Specifically, the control device 19 uses the autonomous lane change control function to re-set the target positions for lane changes so that the object range OS in each of the adjacent lane L2 and the next adjacent lane L3 after the required time T1 includes the required range RR. For example, when the rear portion of the required range RR is not included in the object range OS in each of the adjacent lane L2 and the next adjacent lane L3 after the required time T1 as illustrated in FIG. 10A, the target positions for lane changes are shifted frontward. This allows the required range RR to be included in the object range OS in each of the adjacent lane L2 and the next adjacent lane L3 after the required time T1 as illustrated in FIG. 10B, and a determination is made that a space can be detected which corresponds to the required range RR within the object range OS in each of the adjacent lane L2 and the next adjacent lane L3 after the required time T1. Step S10 is followed by step S6, from which detection of object ranges OS and the like are performed again.

Figure 6B:
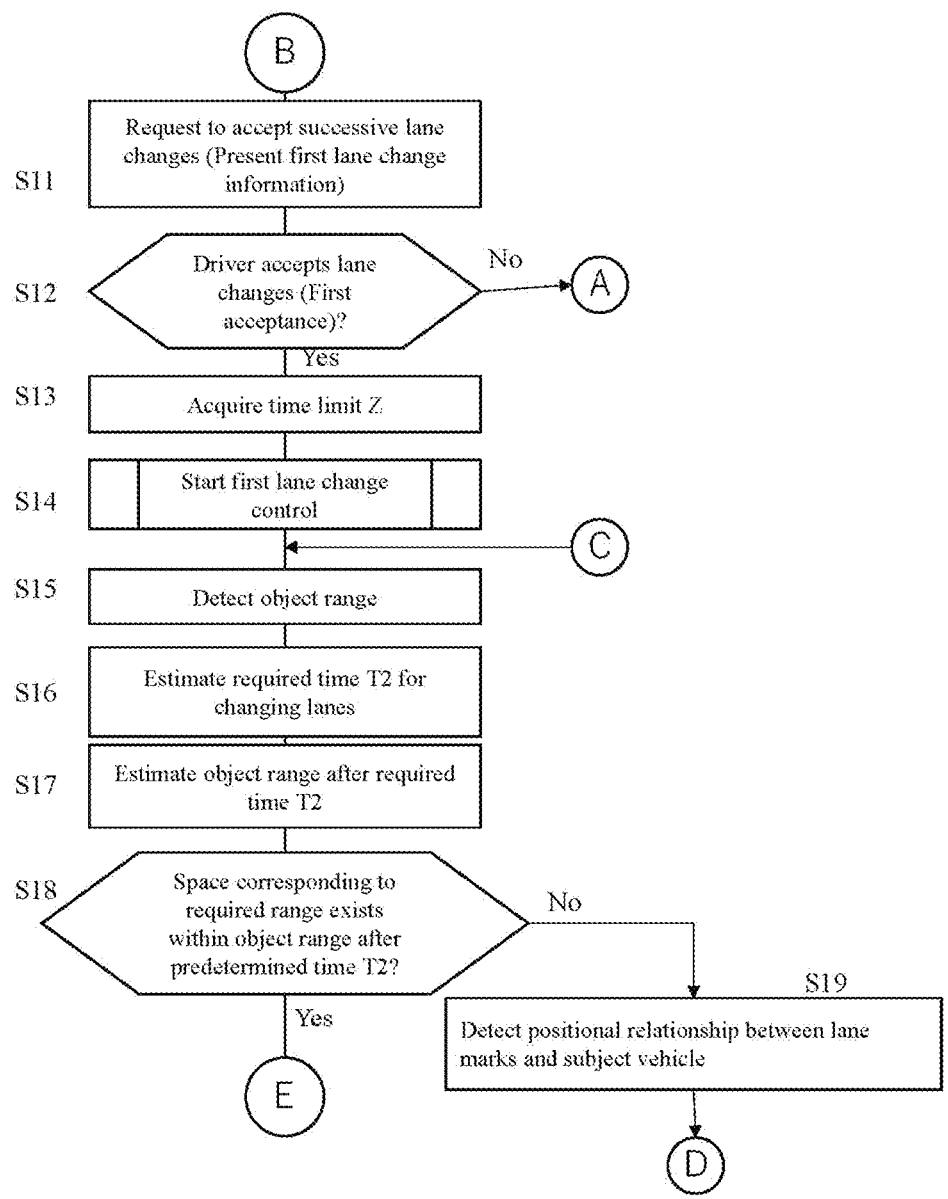
FIG. 6B is a flowchart (part 2) illustrating the lane change control process executed by the travel control apparatus for a vehicle according to the present invention.

On the other hand, when, in step S9 of FIG. 6A, a determination is made that the object range OS in each of the adjacent lane L2 and the next adjacent lane L3 after the required time T1 includes the required range RR, the process proceeds to step S11 illustrated in FIG. 6B. In step S11 of FIG. 6B, the control device 19 uses the autonomous lane change control function to perform an acceptance request process for the autonomous control of successive lane changes. In step S11, the control device 19 has determined a situation in which the autonomous control of successive lane changes is possible through the processes of steps S1 to S9; therefore, before actually executing the autonomous lane change control, the control device 19 requests the driver to make a reply as to whether or not to accept the execution of the autonomous lane change control, in order to encourage the driver to confirm safety by himself/herself. This corresponds to the presentation of the first lane change information according to the present invention.

The acceptance request process executed in step S11 for the autonomous lane change control is performed by presenting the first lane change information, which has been described with reference to the left diagrams of FIGS. 4A to 4C, on the presentation device 15. This will be more specifically described. In the example of FIG. 4A, before starting the autonomous control of successive lane changes from the leftmost lane L1 to the rightmost lane L3 as illustrated in FIG. 3, the control device 19 uses the lane change information presentation function to control the display of the presentation device 15 to display, as illustrated in the left diagram of FIG. 4A, the subject vehicle $V_0$ and the front view image data including the lanes L1, L2, and L3 together with a lane change destination of the subject vehicle $V_0$, which is displayed using a visual pattern such as an arrow, and an acceptance button. In addition, along with this display, voice data is output from the speaker, such as "Do you accept the successive lane changes? If you accept the lane changes, please touch the acceptance button."

In the example of FIG. 4B, before starting the autonomous control of successive lane changes from the leftmost lane L1 to the rightmost lane L3, the control device 19 controls the display of the presentation device 15 to display, as illustrated in the left diagram of FIG. 4B, the subject vehicle $V_0$ and the front view image data including the lanes L1, L2, and L3 together with a lane change destination of the subject vehicle $V_0$, which is displayed using a visual pattern such as an arrow. In addition, along with this display, voice data is output from the speaker, such as "Do you accept the successive lane changes? If you accept the lane changes, please operate the blinker lever twice." (the blinker lever may be return-type one, for example).

In the example of FIG. 4C, before starting the autonomous control of successive lane changes from the leftmost lane L1 to the rightmost lane L3, the control device 19 controls the display of the presentation device 15 to display, as illustrated in the left diagram of FIG. 4C, the subject vehicle $V_0$ and the front view image data including the lanes L1, L2, and L3 together with a lane change destination of the subject vehicle $V_0$, which is displayed using a visual pattern such as an arrow. In addition, along with this display, voice data is output from the speaker, such as "Do you accept the successive lane changes? If you accept the lane changes, please operate the blinker lever in the direction of changing lanes." (the blinker lever may be return-type one, for example).

In step S12, the control device 19 determines whether or not the driver accepts the autonomous control of successive lane changes in response to the acceptance request of step S11. This will be more specifically described. In response to the first lane change information illustrated in the left diagram of FIG. 4A, the driver visually checks the surrounding situation and the like by himself/herself, and in the case of determining to accept the autonomous control of successive lane changes or in other similar cases, the driver touches the acceptance button to indicate the driver's intention to accept the autonomous control of successive lane changes. Likewise, in response to the first lane change information illustrated in the left diagram of FIG. 4B, the driver visually checks the surrounding situation and the like by himself/herself, and in the case of determining to accept the lane changes or in other similar cases, the driver operates the blinker lever twice to indicate the driver's intention to accept the autonomous control of successive lane changes. Likewise, in response to the first lane change information illustrated in the left diagram of FIG. 4C, the driver visually checks the surrounding situation and the like by himself/herself, and in the case of determining to accept the autonomous lane change control or in other similar cases, the driver operates the blinker lever to the right to indicate the driver's intention to accept the autonomous control of successive lane changes. When the driver accepts the lane changes, the process proceeds to step S13, while when the driver does not accept the autonomous lane change control, the process returns to step S1 without executing the autonomous lane change control.

In step S13, the control device 19 uses the autonomous lane change control function to acquire a time limit Z for changing lanes. In one or more embodiments of the present invention, as illustrated in FIG. 2, the table stores as the time limit Z the time for the subject vehicle to approach a point at which the lane change is difficult in each travel scene. The control device 19 uses the autonomous lane change control function to refer to the table illustrated in FIG. 2 to acquire the time limit Z in the travel scene of the subject vehicle. For example, in the "scene of lane transfer toward a destination" among the examples illustrated in FIG. 2, the time limit is stored as (a time to reach the lane change point—α) seconds. In this case, the control device 19 uses the travel control function to refer to the table illustrated in FIG. 2 to calculate the time to reach the lane change point and acquire (the calculated time to reach the lane change point—α) seconds as the time limit Z. The constant α is some seconds (e.g., 5 seconds) and can be set for each travel scene as appropriate. For example, when the time to reach the lane change point is 30 seconds and α is 5 seconds, the time limit Z for changing lanes is 25 seconds.

In step S14, a start process for the autonomous lane change control is performed. In the start process for the autonomous lane change control, the control device 19 uses the autonomous lane change control function to set start timing L at which the autonomous lane change control is started. The method of setting the start timing L is not particularly limited, and the start timing L can be set, for example, with any of the following methods (1) to (8) described below. That is, (1) unique timing is set as the start timing L for the autonomous lane change control. For example, the timing after a predetermined time (e.g., 6 seconds) has elapsed from the driver's acceptance of the autonomous lane change control is set as the start timing L for the autonomous lane change control. (2) The start timing L for the autonomous lane change control is set based on the necessity level of changing lanes illustrated in FIG. 2. Specifically, the necessity level of changing lanes in the travel scene of the subject vehicle is acquired from the table illustrated in FIG. 2, and when the necessity level of changing lanes is not lower than a predetermined value, the start timing L for the autonomous lane change control is set to earlier timing than that in the case in which the necessity level of changing lanes is lower than the predetermined value. (3) The start timing L for the autonomous lane change control is set based on the time limit Z for changing lanes illustrated in FIG. 2. Specifically, the time limit Z for changing lanes in the travel scene of the subject vehicle is acquired from the table illustrated in FIG. 2, and when the time limit Z for changing lanes is less than a predetermined time $Z_{th}$, the start timing L for the autonomous lane change control is set to earlier timing than that in the case in which the time limit Z for changing lanes is not less than the predetermined time $Z_{th}$. (4) The start timing L for the autonomous lane change control is set based on the required time T1 for changing lanes. Specifically, when the required time T1 for changing lanes estimated in step S6 of FIG. 6A is less than a predetermined time $T_{th}$, the start timing L for the autonomous lane change control is set to earlier timing than that in the case in which the required time T1 for changing lanes is not less than the predetermined time $T_{th}$.

(5) The start timing L for the autonomous lane change control is set based on the time limit Z and required time T1 for changing lanes. Specifically, a margin time Y is obtained from the required time T1 for changing lanes and the time limit Z for changing lanes (e.g., Time limit Z−Required time T1=Margin time Y), and when the margin time Y is less than a predetermined time $Y_{th}$, the start timing L for the autonomous lane change control is set to earlier timing than that in the case in which the margin time Y is not less than the predetermined time $Y_{th}$. (6) The start timing L for the autonomous lane change control is set based on an attention level (commitment level) O that represents a degree as to how the driver is involved in the driving. For example, a determination is made whether the driver is making a conversation or hands-free call, by detecting the driver's voice using the input device 16 such as an onboard microphone or a hands-free device, and when the driver is making a conversation or hands-free call, the driver's attention level O is determined to be less than a threshold $O_{th}$, and the start timing L for the autonomous lane change control is set to later timing than that in the case in which the driver's attention level O is not less than the threshold $O_{th}$.

(7) The start timing L for the autonomous lane change control is set based on a traffic congestion level K. For example, the traffic congestion level K is determined based on the distance to a preceding vehicle, the distance to a following vehicle, the number of surrounding vehicles, the congestion level contained in the VICS (registered trademark) information, and/or the degree of deviation between the legal speed and the actual speed of the subject vehicle, and the traffic congestion level K is determined to be higher as the distance to a preceding vehicle is shorter, as the distance to a following vehicle is shorter, as the number of surrounding vehicles is larger, as the congestion level contained in the VICS information is higher, or as the degree of deviation between the legal speed and the actual speed of the subject vehicle is larger. When the traffic congestion level K is not lower than a predetermined value $K_{th}$, the start timing L for the autonomous lane change control is set to earlier timing than that in the case in which the traffic congestion level K is lower than the predetermined value $K_{th}$. (8) The start timing L for the autonomous lane change control is set based on a likelihood B of changing lanes. For example, a degree at which it can be assured that the subject vehicle changes lanes can be obtained as the likelihood B on the basis of the presence or absence of setting of a destination and/or the distance to a preceding vehicle. Specifically, when the destination is set and it is necessary to change lanes in order for the subject vehicle to reach the destination, a determination is made that the likelihood B of changing lanes is not lower than a threshold $B_{th}$. Additionally or alternatively, when the distance to a preceding vehicle is less than a predetermined distance, a determination is made that the driver desires to change lanes, and the likelihood B of changing lanes is determined to be not less than the threshold $B_{th}$. Then, when the likelihood B of changing lanes is not less than the threshold $B_{th}$, the start timing L for the autonomous lane change control is set to earlier timing than that in the case in which the likelihood B of changing lanes is less than the threshold $B_{th}$. Thus, the start timing L for the autonomous lane change control is set as above. The above-described (1) to (8) are examples of the method of setting the start timing L, and the method is not limited to the above.

After setting the start timing L, the control device 19 may set, before starting the autonomous lane change control, preliminary notice presentation timing P for presenting the lane change information indicating that the autonomous lane change control will be started.

When the set start timing L is reached, the control device 19 uses the autonomous lane change control function to start the autonomous lane change control. Specifically, the control device 19 uses the autonomous lane change control function to allow the drive control device 18 to start control of the operation of the steering actuator so that the subject vehicle moves to the target positions for lane changes which are set in step S5 or step S10 of FIG. 6A. After the autonomous lane change control is started, the presentation device 15 may present the lane change information indicating that the autonomous lane change control is being executed.

In steps S15 to S17 of FIG. 6B, like steps S4 and S6 to S7 of FIG. 6A, the current object range OS and the object range OS after the required time T2 for the subject vehicle $V_0$ to move to the target position related to the first lane change (lane change from the lane L1 to the lane L2 of FIG. 8) are detected. Then, in step S18, the control device 19 uses the autonomous lane change control function to determine whether or not there is a space within the object range OS in each of the adjacent lane L2 and the next adjacent lane L3 after the required time T2. The space corresponds to the required range RR acquired in step S8. The object range OS in each of the adjacent lane L2 and the next adjacent lane L3 after the required time T2 is estimated in step S17. Then, the control device 19 uses the autonomous lane change control function to set a required range RR at the target position for each of the first and second lane changes. When the object range OS in each of the adjacent lane L2 and the next adjacent lane L3 after the required time T2 includes the required range RR, the control device 19 determines that there is a space corresponding to the required ranges RR within the object range OS in each of the adjacent lane L2 and the next adjacent lane L3 after the require time T2, and the process proceeds to step S20 of FIG. 6C. On the other hand, when the control device 19 determines that there is not a space corresponding to the required range RR within the object range OS in at least one of the adjacent lane L2 and the next adjacent lane L3 after the require time T2, the process proceeds to step S19. The process of step S19 and the subsequent processes will be described later with reference to FIG. 6E.

In step S20 of FIG. 6C, the control device 19 uses the autonomous lane change control function to determine whether or not the time limit Z acquired in step S13 has elapsed since the first autonomous lane change control was started in step S14. When the elapsed time S1 after starting the first autonomous lane change control exceeds the time limit Z, that is, when the target position for the first lane change cannot be reached even after the time limit Z has elapsed since the autonomous lane change control was started, the process proceeds to step S22. In step S22, the control device 19 uses the autonomous lane change control function to perform a discontinuation process for the first autonomous lane change control. Specifically, the control device 19 uses the autonomous lane change control function to announce the information indicating that the autonomous lane change control will be discontinued to the driver. For example, the control device 19 controls the presentation device 15 to announce a message "Lane changes will be discontinued due to time out" to the driver and then concludes the autonomous lane change control. In the discontinuation process for the autonomous lane change control, the control device 19 may leave the traveling position of the subject vehicle in the road width direction at the position at which the autonomous lane change control is concluded or may also recover the traveling position to the position at which the autonomous lane change control is started. When the traveling position is recovered to the position at which the autonomous lane change control is started, a message may be announced to the driver, such as "The original position will be recovered due to time out."

On the other hand, when, in step S20, the elapsed time S1 from the start of the autonomous lane change control does not exceed the time limit Z, the process proceeds to step S21. In step S21, the control device 19 uses the autonomous lane change control function to determine whether or not the subject vehicle has reached the target position for the first lane change. When the subject vehicle has reached the target position for the first lane change, the process proceeds to step S23. In step S23, the first autonomous lane change control is completed using the autonomous lane change control function, and the presentation device 15 therefore presents the lane change information indicating that the first lane change is completed. When, in step S21, a determination is made that the subject vehicle has not reached the target position for the first lane change, the process returns to step S15 to continue the autonomous lane change control.

In step S24, the control device 19 uses the lane change function to transition to the second autonomous lane change control. That is, in steps S24 to S26, like steps S4 and S6 to S7 of FIG. 6A and steps S15 to S17 of FIG. 6B, the current object range OS and the object range OS after the required time T3 for the subject vehicle $V_0$ to move to the target position related to the second lane change (lane change from the lane L2 to the lane L3 of FIG. 8) are detected. Then, in step S27, the control device 19 uses the autonomous lane change control function to determine whether or not there is a space within the object range OS in the next adjacent lane L3 after the required time T3. The space corresponds to the required range RR acquired in step S8. The object range OS in the next adjacent lane L3 after the required time T3 is estimated in step S25. Then, the control device 19 uses the autonomous lane change control function to set a required range RR at the target position for the lane change. When the object range OS in the next adjacent lane L3 after the required time T3 includes the required range RR, the control device 19 determines that there is a space corresponding to the required range RR within the object range OS in the next adjacent lane L3 after the require time T3, and the process proceeds to step S28. On the other hand, when the control device 19 determines that there is not a space corresponding to the required range RR within the object range OS in the next adjacent lane L3 after the require time T3, the process proceeds to step S39. The process of step S39 and the subsequent processes will be described later with reference to FIG. 6E.

In step S28, the control device 19 uses the autonomous lane change control function to perform an acceptance request process for the second autonomous lane change control. In step S28, the control device 19 has determined a situation in which the autonomous control of successive lane changes is possible through the processes of steps S1 to S9 and has also determined a situation in which the second lane change is possible through the processes of steps S24 to S27; therefore, before actually executing the second autonomous lane change control, the control device 19 requests the driver to make a reply as to whether or not to accept the execution of the second autonomous lane change control, in order to encourage the driver to confirm safety by himself/herself. This corresponds to the presentation of the second lane change information according to the present invention.

The acceptance request process executed in step S28 for the autonomous lane change control is performed by presenting the second lane change information, which has been described with reference to the right diagrams of FIGS. 4A to 4C, on the presentation device 15. This will be more specifically described. In the example of FIG. 4A, before starting the second autonomous lane change control from the central lane L2 to the rightmost lane L3 as illustrated in FIG. 3, the control device 19 uses the lane change information presentation function to control the display of the presentation device 15 to display, as illustrated in the right diagram of FIG. 4A, the subject vehicle $V_0$ and the front view image data including the lanes L1, L2, and L3 together with a lane change destination of the subject vehicle $V_0$, which is displayed using a visual pattern such as an arrow, and a cancel button. In addition, along with this display, voice data is output from the speaker, such as "Do you discontinue the lane changes? If you discontinue the lane changes, please touch the cancel button."

In the example of FIG. 4B, before starting the second autonomous lane change control from the central lane L2 to the rightmost lane L3, the control device 19 controls the display of the presentation device 15 to display, as illustrated in the right diagram of FIG. 4B, the subject vehicle $V_0$ and the front view image data including the lanes L1, L2, and L3 together with a lane change destination of the subject vehicle $V_0$, which is displayed using a visual pattern such as an arrow. In addition, along with this display, voice data is output from the speaker, such as "Do you continue the lane changes? If you continue the lane changes, please operate the blinker lever once."

In the example of FIG. 4C, before starting the second autonomous lane change control from the central lane L2 to the rightmost lane L3, the control device 19 controls the display of the presentation device 15 to display, as illustrated in the right diagram of FIG. 4C, the subject vehicle $V_0$ and the front view image data including the lanes L1, L2, and L3 together with a lane change destination of the subject vehicle $V_0$, which is displayed using a visual pattern such as an arrow, and an acceptance button. In addition, along with this display, voice data is output from the speaker, such as "Do you continue the lane changes? If you continue the lane changes, please touch the acceptance button."

In step S29, the control device 19 determines whether or not the driver accepts the second autonomous lane change control in response to the acceptance request of step S28. This will be more specifically described. In response to the second lane change information illustrated in the right diagram of FIG. 4A, the driver visually checks the surrounding situation and the like by himself/herself, and in the case of determining to accept the second autonomous lane change control or in other similar cases, the driver does not touch the cancel button, so as to indicate the driver's intention to accept the second autonomous lane change control. Likewise, in response to the second lane change information illustrated in the right diagram of FIG. 4B, the driver visually checks the surrounding situation and the like by himself/herself, and in the case of determining to accept the autonomous lane change control or in other similar cases, the driver operates the blinker lever once to indicate the driver's intention to accept the second autonomous lane change control. Likewise, in response to the second lane change information illustrated in the right diagram of FIG. 4C, the driver visually checks the surrounding situation and the like by himself/herself, and in the case of determining to accept the lane change or in other similar cases, the driver touches the acceptance button to indicate the driver's intention to accept the second autonomous lane change control. When the driver accepts the second autonomous lane change control, the process proceeds to step S30, while when the driver does not accept the second autonomous lane change control, the process proceeds to step S31 to execute the discontinuation process for the autonomous lane change control as in the previously described process of step S22.

In step S30, as in the previously described process of step S13, the control device 19 uses the autonomous lane change control function to acquire a time limit Z for the second lane change. In one or more embodiments of the present invention, as illustrated in FIG. 2, the table stores as the time limit Z the time for the subject vehicle to approach a point at which the lane change is difficult in each travel scene. The control device 19 uses the autonomous lane change control function to refer to the table illustrated in FIG. 2 to acquire the time limit Z in the travel scene of the subject vehicle. For example, in the "scene of lane transfer toward a destination" among the examples illustrated in FIG. 2, the time limit is stored as (a time to reach the lane change point−α) seconds. In this case, the control device 19 uses the travel control function to refer to the table illustrated in FIG. 2 to calculate the time to reach the lane change point and acquire (the calculated time to reach the lane change point−α) seconds as the time limit Z. The constant α is some seconds (e.g., 5 seconds) and can be set for each travel scene as appropriate. For example, when the time to reach the lane change point is 30 seconds and α is 5 seconds, the time limit Z for changing lanes is 25 seconds.

In step S30, a start process for the second autonomous lane change control is performed. In the start process for the autonomous lane change control, the control device 19 uses the autonomous lane change control function to set the start timing L at which the second autonomous lane change control is started. The method of setting the start timing L is not particularly limited, and the start timing L can be set, for example, with any of the methods (1) to (8) which are previously described for step S14 of FIG. 6B. After setting the start timing L, the control device 19 may set, before starting the second autonomous lane change control, the preliminary notice presentation timing P for presenting the lane change information indicating that the second autonomous lane change control will be started.

When the set start timing L is reached, the control device 19 uses the autonomous lane change control function to start the second autonomous lane change control. Specifically, the control device 19 uses the autonomous lane change control function to allow the drive control device 18 to start control of the operation of the steering actuator so that the subject vehicle moves to the target position for changing lanes which is set in step S5 or step S10 of FIG. 6A. After the autonomous lane change control is started, the presentation device 15 may present the lane change information indicating that the autonomous lane change control is being executed.

Figure 6D:
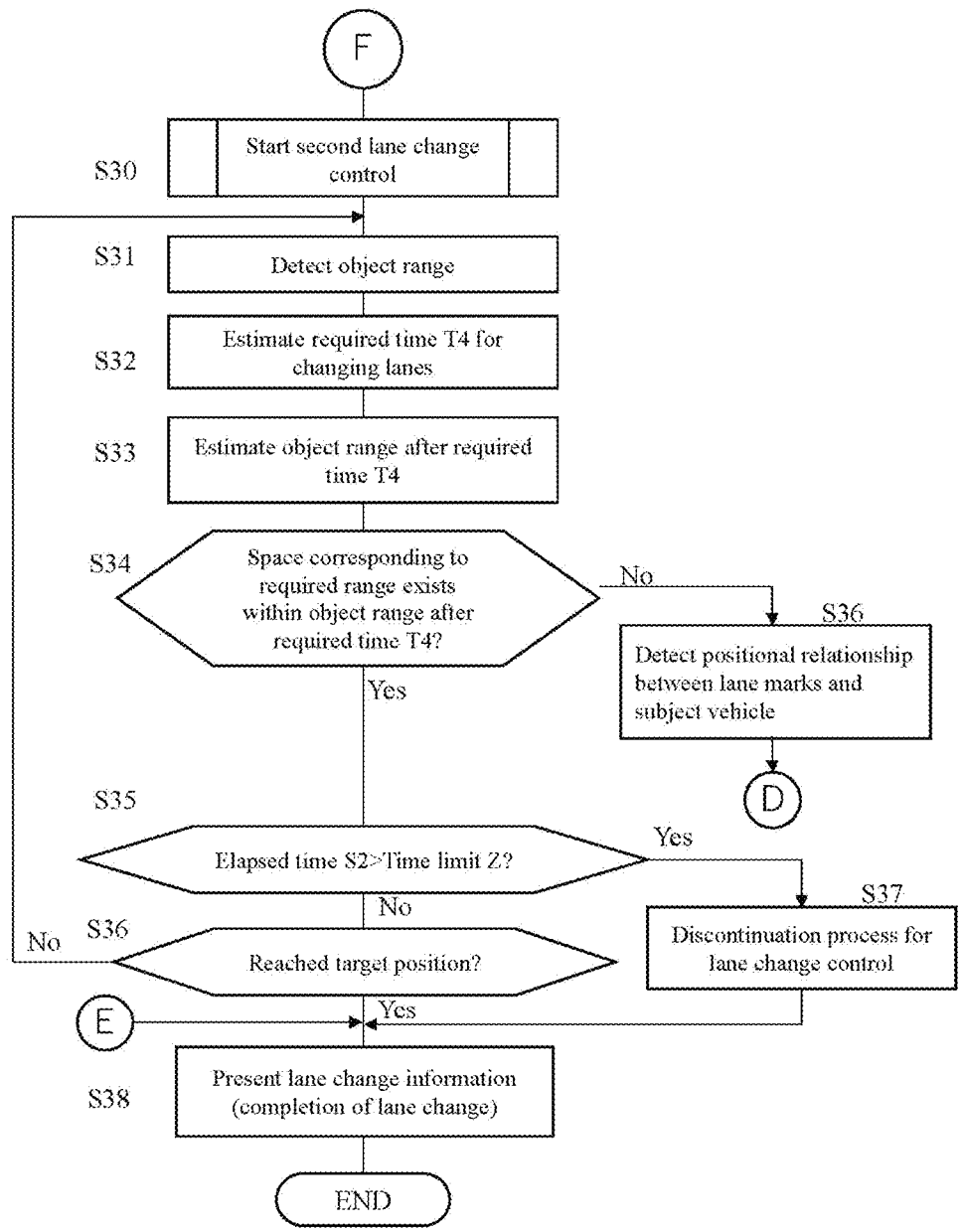
FIG. 6D is a flowchart (part 4) illustrating the lane change control process executed by the travel control apparatus for a vehicle according to the present invention.

In steps S31 to S33 of FIG. 6D, like steps S4 and S6 to S7 of FIG. 6A and steps S15 to S17 of FIG. 6B, the current object range OS and the object range OS after the required time T4 for the subject vehicle $V_0$ to move to the target position related to the second lane change (lane change from the lane L2 to the lane L3 of FIG. 8) are detected. Then, in step S34, the control device 19 uses the autonomous lane change control function to determine whether or not there is a space within the object range OS in the next adjacent lane L3 after the required time T4. The space corresponds to the required range RR acquired in step S8. The object range OS in the next adjacent lane L3 after the required time T4 is estimated in step S32. Then, the control device 19 uses the autonomous lane change control function to set a required range RR at the target position for the second lane change. When the object range OS in the next adjacent lane L3 after the required time T4 includes the required range RR, the control device 19 determines that there is a space corresponding to the required range RR within the object range OS in the next adjacent lane L3 after the require time T4, and the process proceeds to step S35. On the other hand, when the control device 19 determines that there is not a space corresponding to the required range RR within the object range OS in the next adjacent lane L3 after the require time T4, the process proceeds to step S36. The process of step S36 and the subsequent processes will be described later with reference to FIG. 6E.

In step S35, the control device 19 uses the autonomous lane change control function to determine whether or not the time limit Z acquired in step S30 has elapsed since the second autonomous lane change control was started in step S30. When the elapsed time S2 after starting the second autonomous lane change control exceeds the time limit Z, that is, when the target position for the second lane change cannot be reached even after the time limit Z has elapsed since the autonomous lane change control was started, the process proceeds to step S37. In step S37, the control device 19 uses the autonomous lane change control function to perform a discontinuation process for the second autonomous lane change control. Specifically, the control device 19 uses the autonomous lane change control function to announce the information indicating that the autonomous lane change control will be discontinued to the driver. For example, the control device 19 controls the presentation device 15 to announce a message "Lane changes will be discontinued due to time out" to the driver and then concludes the autonomous lane change control. In the discontinuation process for the autonomous lane change control, the control device 19 may leave the traveling position of the subject vehicle in the road width direction at the position at which the autonomous lane change control is concluded or may also recover the traveling position to the position at which the autonomous lane change control is started. When the traveling position is recovered to the position at which the autonomous lane change control is started, a message may be announced to the driver, such as "The original position will be recovered due to time out."

On the other hand, when, in step S35, the elapsed time S2 from the start of the second autonomous lane change control does not exceed the time limit Z, the process proceeds to step S36. In step S36, the control device 19 uses the autonomous lane change control function to determine whether or not the subject vehicle has reached the target position for the second lane change. When the subject vehicle has reached the target position for the second lane change, the process proceeds to step S38. In step S38, the second autonomous lane change control is completed using the autonomous lane change control function, and the presentation device 15 therefore presents the lane change information indicating that the second autonomous lane change control is completed, that is, the autonomous control of successive lane changes is completed. When, in step S36, a determination is made that the subject vehicle has not reached the target position for the second lane change, the process returns to step S31 to continue the autonomous lane change control.

When, in step S18 of FIG. 6B, a determination is made that there is not a space corresponding to the required range RR within the object range OS in each of the adjacent lane L2 and the next adjacent lane L3 after the required time T2, the process proceeds to step S19. That is, when there was a space corresponding to the required range RR within the object range OS in each of the adjacent lane L2 and the next adjacent lane L3 at the time point of step S9 of starting the autonomous control of successive lane changes but there is not a space corresponding to the required range RR within the object range OS in each of the adjacent lane L2 and the next adjacent lane L3 after starting the first autonomous lane change control, the process proceeds to step S19. In step S19, detection is performed for the positional relationship in the road width direction between the subject vehicle and lane marks which the subject vehicle gets across when changing lanes (also referred to as "object lane marks," hereinafter).

Figure 11A:
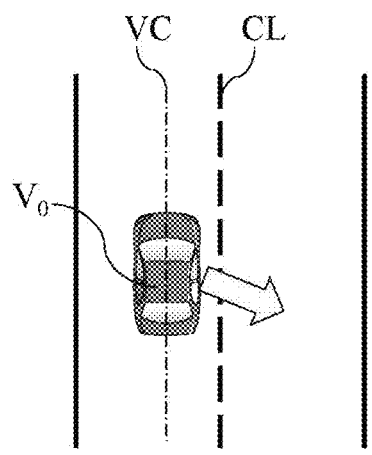
FIG. 11A to FIG. 11D are a set of plan views for describing the positional relationship in the road width direction between object lane marks and the subject vehicle.
Figure 11B:
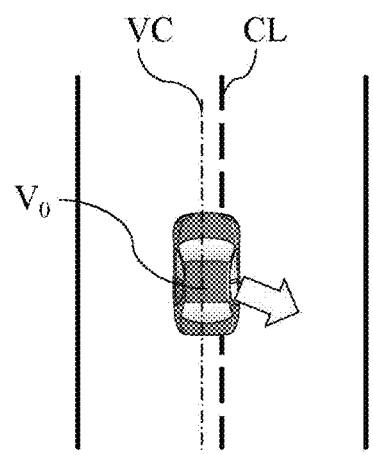
Figure 11C:
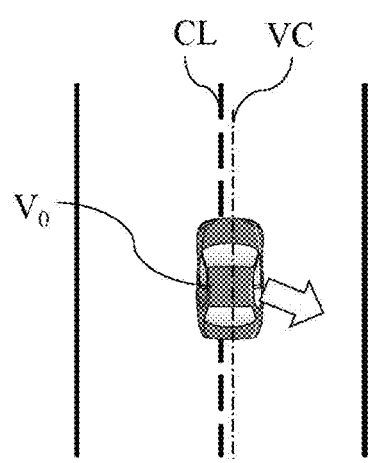
Figure 11D:
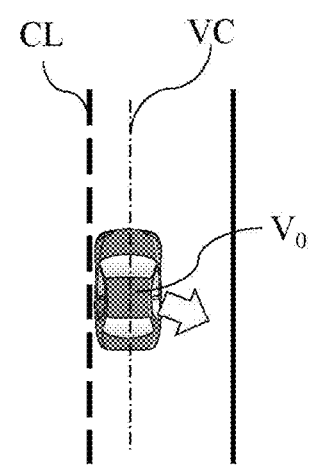

For example, FIG. 11A to FIG. 11D exemplify scenes in which the subject vehicle $V_0$ changes lanes in the direction indicated by arrows in the figure (lane change from the left-side lane to the right-side lane in the figure). In this case, the control device 19 uses the autonomous lane change control function to determine any of a state in which no part of the subject vehicle $V_0$ gets across the object lane marks CL as illustrated in FIG. 11A, a state in which a part of the subject vehicle $V_0$ gets across the object lane marks CL but the center line VC of the subject vehicle $V_0$ does not get across the object lane marks CL as illustrated in FIG. 11B, a state in which the whole of the subject vehicle $V_0$ does not get across the object lane marks CL but the center line VC of the subject vehicle $V_0$ gets across the object lane marks CL as illustrated in FIG. 11C, and a state in which the whole of the subject vehicle $V_0$ gets across the object lane marks CL as illustrated in FIG. 11D.

Figure 6E:
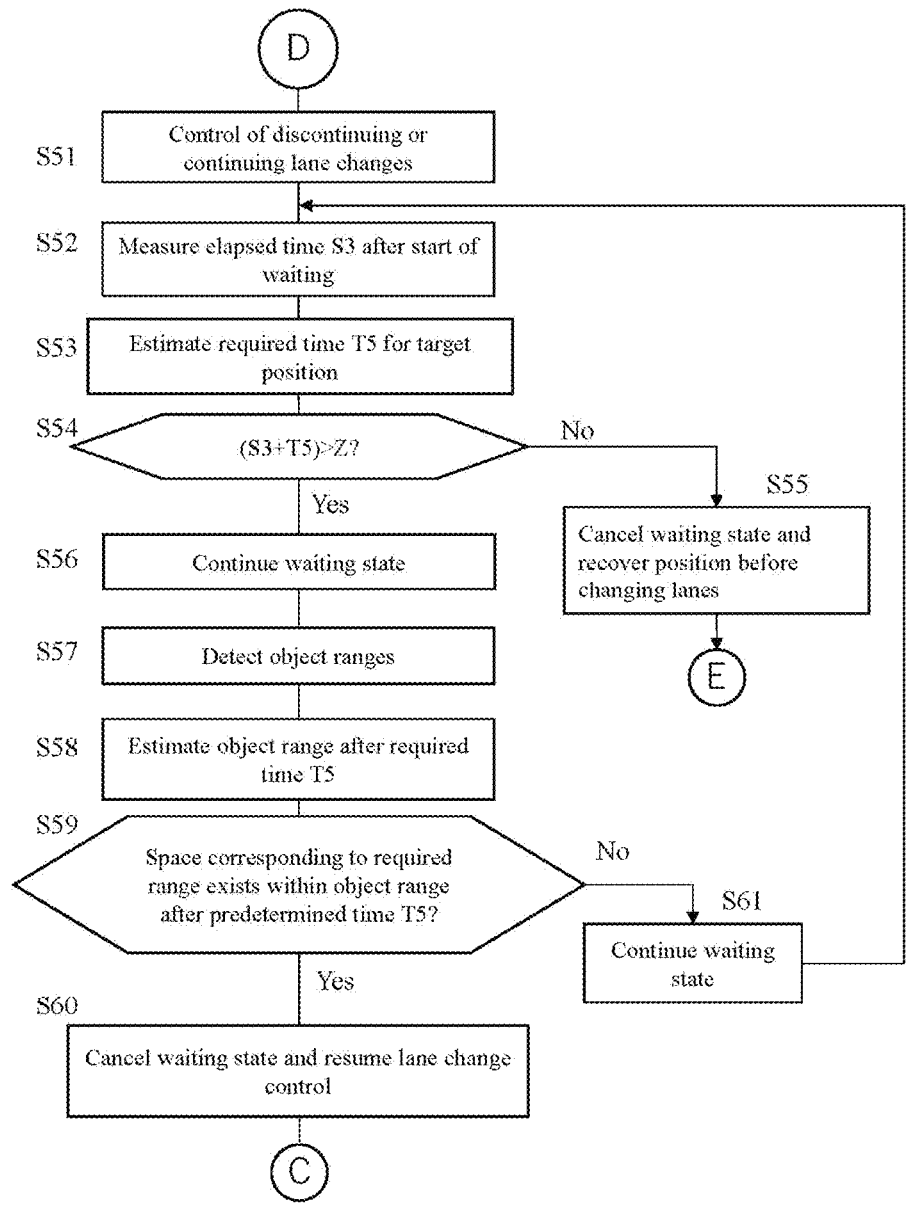
FIG. 6E is a flowchart (part 5) illustrating the lane change control process executed by the travel control apparatus for a vehicle according to the present invention.

In step S51 illustrated in FIG. 6E, the control device 19 uses the autonomous lane change control function to perform a control process for discontinuing or continuing the autonomous lane change control, on the basis of the positional relationship in the road width direction between the object lane marks CL and the subject vehicle $V_0$ determined in step S19 of FIG. 6B. Specifically, the control device 19 uses the autonomous lane change control function to determine (a) a method of presenting information to the driver when discontinuing or continuing the autonomous lane change control, (b) control after discontinuing or continuing the autonomous lane change control, and (c) a traveling position of the subject vehicle $V_0$ when discontinuing or continuing the autonomous lane change control, on the basis of the positional relationship in the road width direction between the object lane marks CL and the subject vehicle $V_0$.

For example, the control device 19 uses the autonomous lane change control function to carry out any of the following four methods as the method (a) of presenting information to the driver when discontinuing or continuing the autonomous lane change control: (a1) a method that includes presenting information for allowing the driver to select between options of discontinuing and continuing the autonomous lane change control without time limit and, when the driver selects any of the options, executing control of the option (discontinuing or continuing the autonomous lane change control) selected by the driver; (a2) a method that includes presenting information for allowing the driver to select between options of discontinuing and continuing lane change with time limit and, when the driver selects any of the options within the time limit, executing control of the option (discontinuing or continuing the autonomous lane change control) selected by the driver or, when the driver does not select between the options within the time limit, executing control (default control) of a predetermined option among the options of discontinuing and continuing the autonomous lane change control; (a3) a method that includes autonomously executing discontinuation or continuation of the autonomous lane change control and expressly providing the driver with a method of canceling the discontinuation or continuation of lane changes which is autonomously executed; and (a4) a method that includes autonomously executing discontinuation or continuation of the autonomous lane change control without expressly providing the driver with a method of canceling the discontinuation or continuation of lane changes which is autonomously executed.

Additionally or alternatively, the control device 19 uses the autonomous lane change control function to carry out any of the following three control schemes as the control content (b) after discontinuing or continuing the autonomous lane change control: (b1) a scheme that includes discontinuing the autonomous lane change control and also discontinuing the autonomous travel control; (b2) a scheme that includes discontinuing only the autonomous lane change control and continuing the autonomous travel control; and (b3) a scheme that includes suspending the autonomous lane change control into a waiting state until a space corresponding to the required range RR is detected again within the object range OS in each of the adjacent lane L2 and the next adjacent lane L3 and resuming the autonomous lane change control when a space corresponding to the required range RR is detected again within the object range OS in each of the adjacent lane L2 and the next adjacent lane L3.

Additionally or alternatively, the control device 19 uses the autonomous lane change control function to carry out any of the following three positional adjustment schemes for the traveling position (c) of the subject vehicle when discontinuing or continuing the autonomous lane change control: (c1) a scheme that includes recovering the position of the subject vehicle to the original position before starting the autonomous lane change control; (c2) a scheme that includes moving the subject vehicle to a position in the vicinity of the object lane marks CL in the lane in which the subject vehicle traveled before starting the autonomous lane change control; and (c3) a scheme that includes maintaining the current position.

The control device 19 uses the autonomous lane change control function to perform the control process for discontinuing or continuing the autonomous lane change control by appropriately combining two or more of the method (a) of presenting information to the driver when discontinuing or continuing the autonomous lane change control, the control content (b) after discontinuing or continuing the autonomous lane change control, and the traveling position (c) of the subject vehicle when discontinuing or continuing the autonomous lane change control, on the basis of the positional relationship in the road width direction between the object lane marks CL and the subject vehicle $V_0$.

For example, when no part of the subject vehicle $V_0$ gets across the object lane marks CL as illustrated in FIG. 11A, the control device 19 can carry out the method (a4) that includes autonomously executing discontinuation of the autonomous lane change control without expressly providing the driver with a method of canceling the discontinuation of the autonomous lane change control. In this case, the control device 19 can use the autonomous lane change control function to carry out the scheme (b1) that includes discontinuing the autonomous lane change control and also discontinuing the autonomous travel control and the scheme (c1) that includes recovering the position of the subject vehicle to the original position before starting the autonomous lane change control. In such a case, the control device 19 can announce the control content to be performed from that time for discontinuing the autonomous lane change control to the driver, such as "Position will be recovered to the original position because the space for changing lanes may be insufficient" and "Autonomous travel control will be canceled after recovery to the original position." In this case, the process proceeds to step S38 of FIG. 6D to conclude the autonomous lane change control.

When a part of the subject vehicle $V_0$ gets across the object lane marks CL but the center line VC of the subject vehicle $V_0$ does not get across the object lane marks CL as illustrated in FIG. 11B, the control device 19 can carry out the method (a3) that includes autonomously executing discontinuation of the autonomous lane change control and expressly providing the driver with a method of canceling the discontinuation of the autonomous lane change control. In this case, the control device 19 can use the autonomous lane change control function to carry out the scheme (c2) that includes moving the subject vehicle $V_0$ to a position in the vicinity of the object lane marks CL in the lane in which the subject vehicle traveled before starting the autonomous lane change control and then carry out the scheme (b2) that includes discontinuing only the autonomous lane change control and continuing the autonomous travel control. In such a case, the control device 19 can announce the control content to be performed from that time for discontinuing the lane changes to the driver, such as "Position will be recovered into the original lane because the space for changing lanes may be insufficient" and "Previous autonomous travel control will be continued after recovery to the original position." Additionally or alternatively, the control device 19 can display a message "Please press the button below if lane changes should be continued" together with a button for continuing the lane changes. When the driver presses the button for continuing lane changes, the process proceeds to step S52 of FIG. 6E, while when the driver does not press the button for continuing lane changes, the process proceeds to step S38 of FIG. 6D.

When the whole of the subject vehicle $V_0$ does not get across the object lane marks CL but the center line VC of the subject vehicle $V_0$ gets across the object lane marks CL as illustrated in FIG. 11C, the control device 19 can carry out the method (a4) that includes autonomously executing continuation of the autonomous lane change control without expressly providing the driver with a method of canceling the continuation of the autonomous lane change control. In this case, the control device 19 can carry out the scheme (c3) that includes waiting while maintaining the traveling position of the subject vehicle at the current position and the scheme (b3) that includes suspending the autonomous lane change control until a space corresponding to the required range RR is detected again within the object range OS in each of the adjacent lane L2 and the next adjacent lane L3 and resuming the autonomous lane change control when a space corresponding to the required range RR is detected again within the object range OS in each of the adjacent lane L2 and the next adjacent lane L3. In this case, for example, the control device 19 can announce the control content to be performed from that time for continuing the autonomous lane change control to the driver, such as "Waiting will be conducted at the current position because the space for changing lanes may be insufficient" and "Autonomous lane change control will be resumed if a space for changing lanes is found." In this case, the process proceeds to step S52 of FIG. 6E.

When the whole of the subject vehicle $V_0$ gets across the object lane marks CL as illustrated in FIG. 11D, the control device 19 can carry out the method (a4) that includes autonomously executing discontinuation of the autonomous lane change control without expressly providing the driver with a method of canceling the discontinuation of the autonomous lane change control. In this case, the control device 19 can carry out the scheme (c3) that includes maintaining the traveling position of the subject vehicle at the current position and the scheme (b2) that includes discontinuing only the autonomous lane change control and continuing the autonomous travel control. In this case, the control device 19 can announce the control content to be performed from that time for discontinuing the autonomous lane change control to the driver, such as "Waiting will be conducted at the current position because the space for changing lanes may be insufficient" and "Previous autonomous travel control will be continued." In this case, the process proceeds to step S38 of FIG. 6D to conclude the travel control process.

The positional relationship in the road width direction between the object lane marks CL and the subject vehicle $V_0$ is not limited to the four scenes illustrated in FIGS. 11(A) to (D) and five or more or three or less possible scenes may be employed. The combination of control schemes for each positional relationship is not limited to the above-described combinations. Any combination is possible among two or more of the method (a) of presenting information to the driver when discontinuing or continuing the autonomous lane change control, the control content (b) after discontinuing or continuing the autonomous lane change control, and the traveling position (c) of the subject vehicle when discontinuing or continuing the autonomous lane change control.

Description will then be made for a case in which continuation of the autonomous lane change control is executed in step S51 of FIG. 6E. Step S51 of starting the continuation of the autonomous lane change control is followed by step S52. In step S52, the control device 19 uses the autonomous lane change control function to measure an elapsed time S3 after the autonomous lane change control comes to a waiting state in step S51. That is, in one or more embodiments of the present invention, when the lane changes are continued in step S51, the lane changes are suspended and the autonomous lane change control comes to a waiting state until a space corresponding to the required range RR is detected again in the object range OS in each of the adjacent lane L2 and the next adjacent lane L3. In step S52, the elapsed time S3 after starting the waiting of the autonomous lane change control in this manner is measured.

In step S53, the control device 19 uses the autonomous lane change control function to estimate a required time T5 for the subject vehicle to move from the current position to the target position for changing lanes. The required time T5 can be estimated in the same method as in step S6 of FIG. 6A.

In step S54, the control device 19 uses the autonomous lane change control function to determine whether or not the total time (S3+T5) of the elapsed time S3 measured in step S52 and the required time T5 estimated in step S53 exceeds the time limit Z acquired in step S13 of FIG. 6B. When the total time (S3+T5) exceeds the time limit Z, the process proceeds to step S55, in which the control device 19 uses the autonomous lane change control function to cancel the waiting state of the autonomous lane change control and move the subject vehicle to the traveling position of the subject vehicle before start of changing lanes. Step S55 is followed by step S38 of FIG. 6D, in which the autonomous lane change control is concluded. On the other hand, when the total time (S3+T5) does not exceed the time limit Z, the process proceeds to step S56.

In step S56, the control device 19 continues the waiting state of the autonomous lane change control. Step S56 is followed by steps S57 to S58, in which the current object range and the object range after the required time T5 are detected as in steps S4 and S7 of FIG. 6A. Then, in step S59, as in step S9 of FIG. 6A, the control device 19 determines whether or not there is a space corresponding to the required range RR within the object range OS in each of the adjacent lane L2 and the next adjacent lane L3 after the required time T5. The object range OS in each of the adjacent lane L2 and the next adjacent lane L3 after the required time T5 is estimated in step S58. In step S59, the control device 19 sets the required range RR at the target position for changing lanes. When the object range OS in each of the adjacent lane L2 and the next adjacent lane L3 after the required time T5 includes the required range RR, the control device 19 determines that there is a space corresponding to the required range RR within the object range OS in each of the adjacent lane L2 and the next adjacent lane L3 after the required time T5, and the process proceeds to step S60. In step S60, the control device 19 uses the autonomous lane change control function to cancel the waiting state of the autonomous lane change control and resume the autonomous lane change control because a space corresponding to the required range RR is detected within the object range OS in each of the adjacent lane L2 and the next adjacent lane L3. The process in this case returns to step S15 of FIG. 6B. On the other hand, when a determination is made in step S59 that there is not a space corresponding to the required range RR within the object range in each of the adjacent lane L2 and the next adjacent lane L3 after the required time T5, the process proceeds to step S61, in which the waiting state of the autonomous lane change control is continued, and the process returns to step S52.

The above processes illustrated in FIG. 6E are borrowed for the process of step S39 of FIG. 6C and the subsequent processes and the process of step S36 of FIG. 6D and the subsequent processes. However, in the process of step S39 of FIG. 6C and the subsequent processes, the processing returns from step S60 of FIG. 6E to step S24 of FIG. 6C, and in the process of step S36 of FIG. 6D and the subsequent processes, the processing returns from step S60 of FIG. 6E to step S31 of FIG. 6D.

As described above, according to the travel control apparatus 1 and travel control method for a vehicle in one or more embodiments of the present invention, upon execution of autonomous lane change control of a vehicle, when performing the autonomous control of two or more successive lane changes, the action load of a second acceptance input made by the driver in response to second lane change information as to whether or not to accept execution of the autonomous lane change control after first autonomous lane change control is set smaller than the action load of a first acceptance input made by the driver in response to first lane change information as to whether or not to accept execution of the autonomous control of the two or more successive lane changes; therefore, the action load of the second acceptance input can be small and it is possible to reduce the load of an action of the driver required for acceptance while confirming the driver's intention.

According to the travel control apparatus 1 and travel control method for a vehicle in one or more embodiments of the present invention, the first acceptance input is detected with a predetermined input operation made by the driver, and the second acceptance input is detected with an operation in which the driver makes no input; therefore, the action load of the second acceptance input can be zero and it is possible to further reduce the load of an action of the driver required for acceptance while confirming the driver's intention.

According to the travel control apparatus 1 and travel control method for a vehicle in one or more embodiments of the present invention, the first lane change information is information for encouraging to execute a predetermined input operation when accepting execution of the autonomous control of two or more successive lane changes, and the second lane change information is information for encouraging to execute a predetermined input operation when not accepting execution of the autonomous lane change control after the first autonomous lane change control; therefore, when performing the second acceptance input, the action load of the second acceptance input can be zero and it is possible to further reduce the load of an action of the driver required for acceptance while confirming the driver's intention.

According to the travel control apparatus 1 and travel control method for a vehicle in one or more embodiments of the present invention, the first acceptance input is detected with a predetermined input operation that is made by the driver and involves a directional property of changing lanes, and the second acceptance input is detected with an input operation that is made by the driver and does not involve the directional property of changing lanes; therefore, the action of the second acceptance input can be a simple action that does not include a determination of the directional property and it is possible to further reduce the load of an action of the driver required for acceptance while confirming the driver's intention.

According to the travel control apparatus 1 and travel control method for a vehicle in one or more embodiments of the present invention, the first acceptance input is detected with a predetermined number of input operations made by the driver, and the second acceptance input is detected with a smaller number than the predetermined number of input operations made by the driver; therefore, the action load of the second acceptance input can be small and it is possible to reduce the load of an action of the driver required for acceptance while confirming the driver's intention.

According to the travel control apparatus 1 and travel control method for a vehicle in one or more embodiments of the present invention, the second lane change information is presented before the vehicle completes the first autonomous lane change control; therefore, the second lane change information can be presented at timing that is neither early nor late and it is thus possible to prevent the delay in the driver's action of the second acceptance input.

According to the travel control apparatus 1 and travel control method for a vehicle in one or more embodiments of the present invention, the second lane change information is presented after the vehicle completes the first autonomous lane change control; therefore, the driver is ensured to have sufficient time for confirming safety around the vehicle and can more easily confirm the safety.

According to the travel control apparatus 1 and travel control method for a vehicle in one or more embodiments of the present invention, the action load of acceptance as to whether or not to accept execution of (n+2)-th autonomous lane change control is set equal to or smaller than the action load of acceptance as to whether or not to accept (n+1)-th autonomous lane change control, that is, in the second acceptance and one or more subsequent acceptances, the action load of the present acceptance is set equal to or smaller than the action load of the previous acceptance; therefore, even when performing the autonomous control of three or more successive lane changes, it is possible to reduce the load of an action of the driver required for acceptance while confirming the driver's intention.

According to the travel control apparatus 1 and travel control method for a vehicle in one or more embodiments of the present invention, when the first acceptance input made by the driver is not detected, execution of the first autonomous lane change control is prohibited and, when the second acceptance input made by the driver is not detected, execution of the autonomous lane change control after the first lane change is prohibited; therefore, it is possible to execute the travel control in which the safety confirmation performed by the driver is prioritized.

DESCRIPTION OF REFERENCE NUMERALS

100 Travel control apparatus
11 Sensors
12 Subject vehicle position detection device
13 Map database
14 Onboard equipment
15 Presentation device
16 Input device
17 Communication device
18 Drive control device
19 Control device
$V_0$ Subject vehicle
$V_1$ Another vehicle
L1, L2, L3 Lane
RS Road shoulder
OS Object range
RR Required range
RA Range in which subject vehicle cannot travel
RL Lane change prohibition mark
CL Object lane mark
VC Center line of subject vehicle

The invention claimed is:
1. A travel control method for a vehicle for executing autonomous lane change control of the vehicle when, before performing the autonomous lane change control, presenting a driver with lane change information as to whether or not to accept execution of the autonomous lane change control and detecting, in response to presentation of the lane change information, an acceptance input made by the driver indicating that the driver accepts the execution of the autonomous lane change control, the travel control method comprising:

upon execution of autonomous control of two or more successive lane changes, before performing the two or more successive lane changes, presenting the driver with first lane change information as to whether or not to accept the execution of the autonomous control of the two or more successive lane changes;

when detecting, in response to presentation of the first lane change information, a first acceptance input made by the driver indicating that the driver accepts the execution of the autonomous control of the two or more successive lane changes, executing first autonomous lane change control;

after executing the first autonomous lane change control, presenting the driver with second lane change information as to whether or not to accept execution of the autonomous lane change control after the first lane change; and when detecting, in response to presentation of the second lane change information, a second acceptance input made by the driver indicating that the driver accepts the execution of the autonomous lane change control after the first lane change, executing the autonomous lane change control after the first lane change, wherein an action load of the second acceptance input is set smaller than an action load of the first acceptance input.

2. The travel control method for a vehicle according to claim 1, comprising:

detecting the first acceptance input with a predetermined input operation made by the driver; and detecting the second acceptance input with an operation in which the driver makes no input.

3. The travel control method for a vehicle according to claim 2, wherein the first lane change information is information for encouraging to execute a predetermined input operation when accepting the autonomous control of the two or more successive lane changes, and the second lane change information is information for encouraging to execute a predetermined input operation when not accepting the autonomous lane change control after the first lane change.

4. The travel control method for a vehicle according to claim 1, comprising:

detecting the first acceptance input with a predetermined input operation that is made by the driver and involves a directional property of changing lanes; and detecting the second acceptance input with an input operation that is made by the driver and does not involve the directional property of changing lanes.

5. The travel control method for a vehicle according to claim 1, comprising:

detecting the first acceptance input with a predetermined number of input operations made by the driver; and detecting the second acceptance input with a smaller number than the predetermined number of input operations made by the driver.

6. The travel control method for a vehicle according to claim 1, comprising:

presenting the second lane change information before the vehicle completes the first autonomous lane change control.

7. The travel control method for a vehicle according to claim 1, comprising:

presenting the second lane change information after the vehicle completes the first autonomous lane change control.

8. The travel control method for a vehicle according to claim 1, wherein the second acceptance input includes an acceptance input as to whether or not to accept (n+1)-th autonomous lane change control after the first autonomous lane change control and an acceptance input as to whether or not to accept (n+2)-th autonomous lane change control where n is a natural number, and the action load of the acceptance input as to whether or not to accept the (n+2)-th autonomous lane change control is set equal to or smaller than the action load of the acceptance input as to whether or not to accept the (n+1)-th autonomous lane change control.

9. The travel control method for a vehicle according to claim 1, comprising:

when not detecting the first acceptance input made by the driver, prohibiting execution of the first autonomous lane change control; and when not detecting the second acceptance input made by the driver, prohibiting execution of the autonomous lane change control after the first lane change.

10. A travel control apparatus for a vehicle for executing autonomous lane change control of the vehicle when, before performing the autonomous lane change control, presenting a driver with lane change information as to whether or not to accept execution of the autonomous lane change control and detecting, in response to presentation of the lane change information, an acceptance input made by the driver indicating that the driver accepts the execution of the autonomous lane change control, the travel control apparatus operating to:

upon execution of control of two or more successive lane changes, before performing the two or more successive lane changes, present the driver with first lane change information as to whether or not to accept the execution of the control of the two or more successive lane changes;

when detecting, in response to presentation of the first lane change information, a first acceptance input made by the driver indicating that the driver accepts the execution of the control of the two or more successive lane changes, execute first autonomous lane change control;

after executing the first autonomous lane change control, present the driver with second lane change information as to whether or not to accept execution of the autonomous lane change control after the first lane change; and when detecting, in response to presentation of the second lane change information, a second acceptance input made by the driver indicating that the driver accepts the execution of the autonomous lane change control after the first lane change, execute the autonomous lane change control after the first lane change, wherein an action load of the second acceptance input is set smaller than an action load of the first acceptance input.

* * * * *